United States Patent
Lefebvre et al.

(10) Patent No.: US 11,710,209 B2
(45) Date of Patent: *Jul. 25, 2023

(54) MULTI-THREAD GRAPHICS PROCESSING SYSTEM

(71) Applicant: ATI Technologies ULC, Markham (CA)

(72) Inventors: Laurent Lefebvre, Lachenaie (CA); Andrew Gruber, Arlington, MA (US); Stephen Morein, Cambridge, MA (US)

(73) Assignee: ATI Technologies ULC, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,824

(22) Filed: May 3, 2022

(65) Prior Publication Data

US 2022/0261947 A1    Aug. 18, 2022

Related U.S. Application Data

(63) Continuation of application No. 17/167,717, filed on Feb. 4, 2021, now Pat. No. 11,361,399, which is a (Continued)

(51) Int. Cl.
*G06T 1/00* (2006.01)
*G06T 1/20* (2006.01)
(Continued)

(52) U.S. Cl.
CPC .............. *G06T 1/20* (2013.01); *G06F 9/3851* (2013.01); *G06T 1/60* (2013.01); *G06T 15/005* (2013.01);
(Continued)

(58) Field of Classification Search
CPC . G06T 1/20; G06T 15/00; G06T 19/00; G06F 9/3009; G06F 2209/5018
See application file for complete search history.

(56) References Cited

U.S. PATENT DOCUMENTS 4,985,848 A    1/1991  Pfeiffer et al.
5,485,559 A    1/1996  Sakaibara et al.
(Continued)

FOREIGN PATENT DOCUMENTS

EP    2296116 A2    3/2011
EP    2299408 A2    3/2011
(Continued)

OTHER PUBLICATIONS

European Patent Office Examination Report, EP Application No. 04798938.9, dated Nov. 9, 2006; pp. 1-3.
(Continued)

*Primary Examiner* — Hau H Nguyen
(74) *Attorney, Agent, or Firm* — Sterne, Kessler, Goldstein & Fox P.L.L.C.

(57) ABSTRACT

A graphics processing system comprises at least one memory device storing a plurality of pixel command threads and a plurality of vertex command threads. An arbiter coupled to the at least one memory device is provided that selects a pixel command thread from the plurality of pixel command threads and a vertex command thread from the plurality of vertex command threads. The arbiter further selects a command thread from the previously selected pixel command thread and the vertex command thread, which command thread is provided to a command processing engine capable of processing pixel command threads and vertex command threads.

20 Claims, 4 Drawing Sheets

Related U.S. Application Data continuation of application No. 16/424,145, filed on May 28, 2019, now Pat. No. 10,957,007, which is a continuation of application No. 15/901,603, filed on Feb. 21, 2018, now Pat. No. 10,346,945, which is a continuation of application No. 15/006,802, filed on Jan. 26, 2016, now Pat. No. 9,922,395, which is a continuation of application No. 14/299,600, filed on Jun. 9, 2014, now Pat. No. 9,904,970, which is a continuation of application No. 13/846,210, filed on Mar. 18, 2013, now Pat. No. 8,749,563, which is a continuation of application No. 11/746,446, filed on May 9, 2007, now Pat. No. 8,400,459, which is a continuation of application No. 10/673,761, filed on Sep. 29, 2003, now Pat. No. 7,239,322.

(51) Int. Cl.

| | | |
|---|---|---|
| *G06F 9/38* | (2018.01) | |
| *G06T 15/00* | (2011.01) | |
| *G06T 15/04* | (2011.01) | |
| *G06T 1/60* | (2006.01) | |
| *G09G 5/00* | (2006.01) | |
| *G09G 5/36* | (2006.01) | |

(52) U.S. Cl.
CPC ............ *G06T 15/04* (2013.01); *G09G 5/001* (2013.01); *G09G 5/363* (2013.01)

(56) References Cited

U.S. PATENT DOCUMENTS

| | | |
|---|---|---|
| 5,500,939 A | 3/1996 | Kurihara |
| 5,550,962 A | 8/1996 | Nakamura et al. |
| 5,808,690 A | 9/1998 | Rich |
| 5,818,469 A | 10/1998 | Lawless et al. |
| 5,968,167 A | 10/1999 | Whittaker et al. |
| 6,105,127 A | 8/2000 | Kimura et al. |
| 6,118,452 A | 9/2000 | Gannett |
| 6,208,361 B1 | 3/2001 | Gossett |
| 6,239,810 B1 | 5/2001 | Van Hook et al. |
| 6,288,730 B1 | 9/2001 | Duluk, Jr. et al. |
| 6,353,439 B1 | 3/2002 | Lindholm |
| 6,384,824 B1 | 5/2002 | Morgan et al. |
| 6,417,858 B1 | 7/2002 | Bosch et al. |
| 6,545,683 B1 | 4/2003 | Williams |
| 6,573,893 B1 | 6/2003 | Naqvi et al. |
| 6,630,935 B1 | 10/2003 | Taylor et al. |
| 6,650,327 B1 | 11/2003 | Airey et al. |
| 6,650,330 B2 | 11/2003 | Lindholm et al. |
| 6,704,018 B1 | 3/2004 | Mori et al. |
| 6,717,599 B1 | 4/2004 | Olano |
| 6,724,394 B1 | 4/2004 | Zatz et al. |
| 6,731,289 B1 | 5/2004 | Peercy et al. |
| 6,749,563 B2 | 6/2004 | Stihl |
| 6,809,732 B2 | 10/2004 | Zatz et al. |
| 6,864,893 B2 | 3/2005 | Zatz |
| 6,897,871 B1 | 5/2005 | Morein et al. |
| 6,954,204 B2 | 10/2005 | Zatz et al. |
| 6,980,209 B1 | 12/2005 | Donham et al. |
| 7,015,913 B1 | 3/2006 | Lindholm et al. |
| 7,038,685 B1 | 5/2006 | Lindholm |
| 7,081,895 B2 | 7/2006 | Papakipos et al. |
| 7,233,335 B2 | 6/2007 | Moreton et al. |
| 7,239,322 B2 | 7/2007 | Lefebvre et al. |
| 7,321,369 B2 | 1/2008 | Wyatt et al. |
| 7,327,369 B2 | 2/2008 | Morein et al. |
| 7,363,472 B2 | 4/2008 | Stuttard et al. |
| 7,376,811 B2 | 5/2008 | Kizhepat |
| 7,673,304 B2 | 3/2010 | Gosalia et al. |
| 7,742,053 B2 | 6/2010 | Lefebvre et al. |
| 7,746,348 B2 | 6/2010 | Lefebvre et al. |
| 8,072,461 B2 | 12/2011 | Lefebvre et al. |
| 8,305,382 B2 | 11/2012 | Lefebvre et al. |
| 8,400,459 B2 | 3/2013 | Lefebvre et al. |
| 8,749,563 B2 | 6/2014 | Lefebvre et al. |
| 9,904,970 B2 | 2/2018 | Lefebvre et al. |
| 9,922,395 B2 | 3/2018 | Lefebvre et al. |
| 10,346,945 B2 | 7/2019 | Lefebvre et al. |
| 2003/0030643 A1 | 2/2003 | Taylor et al. |
| 2003/0076320 A1 | 4/2003 | Collodi |
| 2003/0164830 A1 | 9/2003 | Kent |
| 2004/0041814 A1 | 3/2004 | Wyatt et al. |
| 2004/0164987 A1 | 8/2004 | Aronson et al. |
| 2005/0068325 A1 | 3/2005 | Lefebvre et al. |
| 2005/0110792 A1 | 5/2005 | Morein et al. |
| 2005/0200629 A1 | 9/2005 | Morein et al. |
| 2007/0222785 A1 | 9/2007 | Lefebvre et al. |
| 2007/0222786 A1 | 9/2007 | Lefebvre et al. |
| 2007/0222787 A1 | 9/2007 | Lefebvre et al. |
| 2007/0285427 A1 | 12/2007 | Morein et al. |
| 2010/0156915 A1 | 6/2010 | Lefebvre et al. |
| 2010/0231592 A1 | 9/2010 | Morein et al. |
| 2011/0216077 A1 | 9/2011 | Morein et al. |
| 2012/0019543 A1 | 1/2012 | Lefebvre et al. |
| 2013/0215128 A1 | 8/2013 | Lefebvre et al. |
| 2014/0292784 A1 | 10/2014 | Lefebvre et al. |
| 2016/0140687 A1 | 5/2016 | Lefebvre et al. |
| 2018/0182060 A1 | 6/2018 | Lefebvre et al. |

FOREIGN PATENT DOCUMENTS

| | | |
|---|---|---|
| EP | 2309460 A1 | 4/2011 |
| WO | WO 00/62182 | 10/2000 |
| WO | WO 2005/050570 A1 | 6/2005 |

OTHER PUBLICATIONS

Purcell et al., Ray Tracing on Programmable Graphics Hardware, SIGGRAPH '02, San Antonio, TX, ACM Transactions on Graphics, Jul. 2002, vol. 21, No. 3; pp. 703-712.

Mark et al., Cg: A System for Programming Graphics Hardware in a C-like Language, SIGGRAPH '03, San Diego, CA, ACM Transactions on Graphics, Jul. 2003, vol. 22, No. 3; pp. 896-907.

Breternitz, Jr., Mauricio, et al.; Compilation, Architectural Support, and Evaluation of SIMD Graphics Pipeline Programs on a General-Purpose CPU; 2003; pp. 1-11; IEEE.

International Search Report for PCT Patent Application PCT/IB2004/003821 dated Mar. 22, 2005.

EP Supplemental Search Report directed to EP Application No. 10075688.1, dated Feb. 25, 2011.

EP Supplemental Search Report directed to EP Application No. 10075686.5, dated Feb. 25, 2011.

EP Supplemental Search Report directed to EP Application No. 10075687.3, dated Feb. 25, 2011.

EP Supplemental Search Report directed to EP Application No. 10075685.7, dated Feb. 25, 2011.

Eldridge et al., Pomegranate: A Fully Scalable Graphics Architecture, Computer Graphics, SIGGRAPH 2000 Conference Proceedings, Jul. 23, 2000.

Owens et al., Polygon Rendering on a Stream Architecture, Proceedings 2000 SIGGRAPH/Europgraphics Workshop on Graphics Hardware, Aug. 21, 2000.

Chinese Office Action directed to Chinese Application No. 2004800405708, dated Sep. 2008.

Chinese Office Action directed to Chinese Application No. 2004800405708, dated Nov. 2009.

Chinese Office Action directed to Chinese Application No. 2004800405708, dated Sep. 2010.

Chinese Office Action directed to Chinese Application No. 2004800405708, dated Feb. 24, 2011.

Prosecution History of U.S. Pat. No. 7,742,053, U.S. Appl. No. 11/746,453, filed Sep. 29, 2003; 136 pages.

Declaration of Dr. Nader Bagherzadeh, *LG Electronics v. ATI Technologies ULC*, Case No. IPR2015-00325, Dec. 10, 2014; 87 pages.

Curriculum Vitae of Nader Bagherzadeh, Ph.D., *LG Electronics v. ATI Technologies ULC*, Case No. IPR2015-00325, Dec. 10, 2014; 33 pages.

(56) References Cited

OTHER PUBLICATIONS

Woo et al., OpenGL Programming Guide: The Official Guide to Learning OpenGL, Version 1.1 (OTL), pp. 1-26, 37-48, 154-168, 180-195, and 296-308 (1997).
Foley et al., Computer Graphics: Principles and Practice, pp. 201-210, FIG. 16.5, pp. 721-728 (1990).
Petition for Inter Partes Review of U.S. Pat. No. 7,742,053, *LG Electronics v. ATI Technologies ULC*, Case No. IPR2015-00325, filed Dec. 10, 2014; 67 pages.
Patent Owner's Preliminary Response, *LG Electronics v. ATI Technologies ULC*, Case No. IPR2015-00325, filed Apr. 13, 2015; 70 pages.
Intel, i860 Microprocessor Family Programmer's Reference Manual, 1991.
Boyd, Boyd, Chapter 5: DirectX, SIGGRAPH, 2002.
Microsoft, Microsoft DirectX 8.1 (C++), Programmers Guide, 2002.
Ellsworth, Polygon Rendering for Interactive Visualization on Multicomputers, the University of North Carolina at Chapel Hill, 1996.
Owens, Computer Graphics on a Stream Architecture, 2002.
England, Graphics-Intensive Applications Get a Boost, Application Acceleration: Development of the TAAC-1, Sun Technology, 1998.
Meibner et al., Parallel Volume Rendering on a Single-Chip SIMD Architecture, IEEE, 2001.
Grimes et al., 64-Bit Processor The Intel i860 64-Bit Processor: A General-Purpose CPU with 3D Graphics Capabilities, IEEE, 1989.
Intel, i860 Microprocessor Hardware Design Guide, 1989.
Patel et al., Architectural Features of the i860-Microprocessor RISC Core and On-Chip Caches, IEEE, 1989.
Eggers et al., Simultaneous Multithreading: A Platform for Next-Generation Processors, IEEE Micro, 1997.
Mattson, A Programming System for the Imagine Media Processor, Standford University 2002.
Rixner, A Bandwidth-efficient Achitecture for a Streaming Media Processor, MIT 2001.
Tullsen et al., Simultaneous Multithreading: Maximizing On-Chip Parallelism, ACM, 1995.
Rixner et al., A Bandwidth-Efficient Architecture for Media Processing, Micro-31, 1998.
Rixner, Stream Processor Architecture, Rice Uni., Aug. 1, 2001.
Kapasi, Stream Scheduling, Micro-34, Dec. 2, 2001.
Crockett et al., Parallel Polygon Rendering for Message-Passing Architectures, IEEE Parallel & Distributed Technology, 1999.
Kohn et al., Introducing the Intel i860 64-Bit Microprocsesor, IEEE, 1989.
Khailany et al., Imagine: Media Processing with Streams, IEEE, 2001.
England et al., A Graphics System Architecture for Interactive Application-Specific Display Functions, IEEE CG&A 1986.
Ungerer et al., Multithreaded Processors, British Computer Society 2002.
Stokes, Introduction to Multithreading, Superthreading and Hyperthreading, 2002.
Patent Owner's Notice of Appeal, *LG Electronics v. ATI Technologies ULC*, Case No. IPR2015-00330, Sep. 2, 2016; 6 pages.
McConnell, Massively Parallel Computing on the Fuzion Chip, Aug. 25, 1999.
Silicon Graphics, The OpenGL Graphics System: A Specification, Version 1.4, 2002.
Rost, Course 17: State-of-the-Art in Hardware Rendering, The OpenGL Shading Language, SIGGRAPH 2002.
McCool, SMASH: A Next-Generation API for Programmable Graphics Acceleration, Uni. Of Waterloo, Apr. 20, 2001.
Olano, SGI OpenGl Shader, SIGGRAPH 2002.
Rost, Course 17: State-of-the-Art in Hardware Rendering, Chapter 6: The OpenGL Shading Language, Course Notes, SIGGRAPH 2002.
U.S. Final Office Action directed to corresponding U.S. Appl. No. 11/746,446, dated Sep. 26, 2010.
Institution Decision, *LG Electronics v. ATI Technologies ULC*, Case No. IPR2015-00325, issued Jun. 15, 2015; 38 pages.

Patent Owner's Response, *LG Electronics v. ATI Technologies ULC*, Case No. IPR2015-00325, filed Sep. 9, 2015; 73 pages.
Petitioner's Reply, *LG Electronics v. ATI Technologies ULC*, Case No. IPR2015-00325, filed Dec. 3, 2015; 33 pages.
Final Written Decision, *LG Electronics v. ATI Technologies ULC*, Case No. IPR2015-00325, dated Apr. 14, 2016; 105 pages.
Petition for Inter Partes Review of U.S. Pat. No. 6,897,871, *LG Electronics v. ATI Technologies ULC*, Case No. IPR2015-00326, filed Dec. 10, 2014; 67 pages.
Patent Owner's Preliminary Response, *LG Electronics v. ATI Technologies ULC*, Case No. IPR2015-00326, filed Apr. 13, 2015; 37 pages.
Institution Decision, *LG Electronics v. ATI Technologies ULC*, Case No. IPR2015-00326, issued Jul. 10, 2015; 28 pages.
Patent Owner's Response, *LG Electronics v. ATI Technologies ULC*, Case No. IPR2015-00326, filed Oct. 15, 2015; 62 pages.
Petitioner's Reply, *LG Electronics v. ATI Technologies ULC*, Case No. IPR2015-00326, filed Jan. 11, 2016; 32 pages.
Final Written Decision, *LG Electronics v. ATI Technologies ULC*, Case No. IPR2015-00326, dated Jun. 28, 2016; 20 pages.
Petition for Inter Partes Review of U.S. Pat. No. 7,327,369, *LG Electronics v. ATI Technologies ULC*, Case No. IPR2015-00330, filed Dec. 10, 2014; 65 pages.
Patent Owner's Preliminary Response, *LG Electronics v. ATI Technologies ULC*, Case No. IPR2015-003330, filed Apr. 13, 2015; 36 pages.
Institution Decision, *LG Electronics v. ATI Technologies ULC*, Case No. IPR2015-00330, issued Jul. 10, 2015; 20 pages.
Patent Owner's Response, *LG Electronics v. ATI Technologies ULC*, Case No. IPR2015-00330, filed Oct. 15, 2015; 41 pages.
Petitioner's Reply, *LG Electronics v. ATI Technologies ULC*, Case No. IPR2015-00330, filed Jan. 11, 2016; 23 pages.
Final Written Decision, *LG Electronics v. ATI Technologies ULC*, Case No. IPR2015-00330, dated Jul. 1, 2016; 13 pages.
Proposed Patent Owner's Revised Redacted Response, *LG Electronics v. ATI Technologies ULC*, Case No. IPR2015-00325, Oct. 9, 2015; 73 pages.
Declaration of Raymond Vargas, *LG Electronics v. ATI Technologies ULC*, Case No. IPR2015-00325, filed Dec. 3, 2015; 24 pages.
Deposition Transcript of Calvin Watson, *LG Electronics v. ATI Technologies ULC*, Case Nos. IPR2015-00325, -00326, and -00330, Nov. 4, 2015; 84 pages.
Deposition Transcript of Dr. Andrew Wolfe, Day One, *LG Electronics v. ATI Technologies ULC*, Case Nos. IPR2015-00325, -00326, and -00330, Nov. 9, 2015; 280 pages.
Deposition Transcript of Dr. Andrew Wolfe, Day Two, *LG Electronics v. ATI Technologies ULC*, Case Nos. IPR2015-00325, -00326, and -00330, Nov. 10, 2015; 59 pages.
Deposition Transcript of Laurent Lefebvre, *LG Electronics v. ATI Technologies ULC*, Case Nos. IPR2015-00325, -00326, and -00330, Nov. 13, 2015; 159 pages.
Independent Claims of U.S. Pat. No. 7,742,053, filed May 9, 2007; 1 page.
*L-3 Commc'ns Corp. v. Sony Corp.*, Case No. 10-cv-734-RGA, 2013 U.S. Dist. LEXIS 148680 (D. Del. Oct. 16, 2013); 2 pages.
*Suncast Corp. v. Avon Plastics*, Case No. 97-cv-178, 1999 U.S. Dist. LEXIS 15222 (N.D. III. Sep. 21, 1999); 21 pages.
Transcript of Teleconference, *LG Electronics v. ATI Technologies ULC*, Case No. IPR2015-00325, Jan. 21, 2016; 9 pages.
Petitioner's Hearing Demonstratives, *LG Electronics v. ATI Technologies ULC*, Case No. IPR2015-00325, filed Feb. 9, 2016; 20 pages.
Patent Owner's Notice of Appeal, *LG Electronics, Inc. v. ATI Technologies ULC*, IPR2015-00325, Jun. 15, 2016; 8 pages.
OpenGL Overview, accessed Nov. 23, 2014, https://www.opengl.org/about/#1; 5 pages.
Declaration of Laurent Lefebvre, *LG Electronics v. ATI Technologies ULC*, Case No. IPR2015-00325, filed Sep. 9, 2015; 61 pages.
R400 Sequencer Specification (Version 0.1), May 7, 2001; 9 pages.
R400 Sequencer Specification (Version 0.3), May 7, 2001; 16 pages.
R400 Sequencer Specification (Version 0.4), Aug. 14, 2001; 20 pages.

(56) References Cited

OTHER PUBLICATIONS

R400 Sequencer Specification (Version 0.5), Aug. 14, 2001; 26 pages.
R400 Sequencer Specification (Version 0.6), Sep. 24, 2001; 31 pages.
R400 Sequencer Specification (Version 0.7), Sep. 24, 2001; 33 pages.
R400 Sequencer Specification (Version 0.8), Sep. 24, 2001; 26 pages.
R400 Sequencer Specification (Version 0.9), Sep. 24, 2001; 27 pages.
R400 Sequencer Specification (Version 1.0), Sep. 24, 2001; 28 pages.
R400 Sequencer Specification (Version 1.1), Sep. 24, 2001; 32 pages.
R400 Sequencer Specification (Version 1.2), Sep. 24, 2001; 35 pages.
R400 Sequencer Specification (Version 1.4), Sep. 24, 2001; 43 pages.
R400 Sequencer Specification (Version 1.5), Sep. 24, 2001; 48 pages.
R400 Sequencer Specification (Version 1.6), Sep. 24, 2001; 47 pages.
R400 Sequencer Specification (Version 1.7), Sep. 24, 2001; 50 pages.
R400 Sequencer Specification (Version 1.8), Sep. 24, 2001; 48 pages.
R400 Sequencer Specification (Version 1.9), Sep. 24, 2001; 50 pages.
R400 Sequencer Specification (Version 1.10), Sep. 24, 2001; 52 pages.
R400 Sequencer Specification (Version 1.11), Sep. 24, 2001; 52 pages.
R400 Sequencer Specification (Version 2.0), Sep. 24, 2001; 58 pages.
R400 Sequencer Specification (Version 2.1), Sep. 24, 2001; 54 pages.
R400 Sequencer Specification (Version 2.2), Sep. 24, 2001; 53 pages.
R400 Sequencer Specification (Version 2.3), Sep. 24, 2001; 54 pages.
R400 Sequencer Specification (Version 2.4), Sep. 24, 2001; 51 pages.
R400 Sequencer Specification (Version 2.5), Sep. 24, 2001; 53 pages.
R400 Sequencer Specification (Version 2.6), Sep. 24, 2001; 51 pages.
R400 Sequencer Specification (Version 2.7), Sep. 24, 2001; 51 pages.
R400 Sequencer Specification (Version 2.8), Sep. 24, 2001; 51 pages.
R400 Sequencer Specification (Version 2.9), Sep. 24, 2001; 54 pages.
R400 Sequencer Specification (Version 2.10), Sep. 24, 2001; 56 pages.
R400 Sequencer Specification (Version 2.11), Jul. 9, 2003; 54 pages.
R400 Architecture Proposal (Version 0.1), Nov. 13, 2000; 16 pages.
R400 Top Level Specification (Version 0.2), Mar. 11, 2001; 32 pages.
R400 Shader Processor (Version 0.1), Jan. 23, 2001; 12 pages.
R400 Sequencer Specification Log (Versions 0.1 to 1.2), May 25, 2001 through Nov. 16, 2011; 1 page.
R400 Sequencer Specification Log (Versions 1.4 to 2.11), Nov. 26, 2001 through Aug. 29, 2003; 2 pages.
R400 Architecture Proposal Log, Nov. 15, 2000 through Jul. 5, 2001; 1 page.
R400 Top Level Specification Log, Mar. 15, 2000 through Jul. 5, 2001; 1 page.
R400 Shader Processor Log, May 9, 2001 through Nov. 27, 2001; 1 page.
R400 Sequencer Emulator Folder History, Dec. 12, 2001 through Jun. 24, 2004; 19 pages.
R400 Sequencer Parts Folder History, Dec. 3, 2001 through Jun. 15, 2004; 34 pages.
R400 Document Library Folder History, Nov. 1, 2000 through Apr. 8, 2005; 111 page.
R400 Architecture Folder History, Nov. 15, 2000 through Dec. 12, 2003; 27 pages.
R400 GFX Sequencer Testing Folder History, Jul. 24, 2001 through Oct. 6, 2005; 128 pages.
Pellerite, P., ATI Technologies R400 Program, Program Review Slides, Dec. 13, 2001; 6 pages.
Gruber, A., ATI Technologies R400 Program, Architecture Slides, Dec. 13, 2001; 9 pages.
Cox, J., ATI Technologies R400 Program Review Slides, Dec. 13, 2001; 16 pages.
Fowler, M., ATI Technologies R400 Program, Marlboro Design Slides, Dec. 13, 2001; 21 pages.
Pellerite, P., ATI Technologies R400 Program, R400 Executive Review Slides, Jan. 17, 2002; 17 pages.
Fowler, M., ATI Technologies R400 Program Review Slides, Mar. 22, 2002; 6 pages.
Cox, J., ATI Technologies R400 Program, Program Review Slides, Mar. 22, 2002; 8 pages.
Pellerite, P., ATI Technologies R400 Program, March Review Slides, Mar. 22, 2002; 5 pages.
Fowler, M., ATI Technologies R400 Program, GC Design Status Slides, May 30, 2002; 12 pages.
Pellerite, P., ATI Technologies R400 Program, May Review Slides, May 30, 2002; 5 pages.
Cox, et al., ATI Technologies R400 Program Review Slides, Aug. 30, 2002; 16 pages.
Correll, K., ATI Technologies R400 Program, Hardware Design Slides, Aug. 30, 2002; 5 pages.
Fowler, M., ATI Technologies R400 Program, Emulator Status Slides, Aug. 30, 2002; 5 pages.
Pellerite, P., ATI Technologies R400 Program, Program Review Slides, Aug. 30, 2002; 6 pages.
Correll, K., ATI Technologies R400 Program, Marlboro Hardware Design Block Status Slides, Oct. 10, 2002; 5 pages.
Fowler, M., ATI Technologies R400 Program, Emulator Status Slides, Oct. 10, 2002; 4 pages.
Pellerite, P., ATI Technologies R400 Program Review Slides, Oct. 10, 2002; 11 pages.
Correll, K., ATI Technologies R400 Program, Marlboro Hardware Design Status Slides, Nov. 12, 2002; 3 pages.
Pellerite, P., ATI Technologies R400 Program Review Slides, Nov. 12, 2002; 7 pages.
RTL Code File: sq.v, ATI Technologies, Inc., 2001; 24 pages.
RTL Code File: sq_thread_buff.v, ATI Technologies, Inc., 2001; 14 pages.
RTL Code File: sq_thread_arb.v, ATI Technologies, Inc., 2001; 8 pages.
RTL Code File: sq_ctl_flow_seq.v, ATI Technologies, Inc., 2001; 13 pages.
RTL Code File: sq_instruction_store.v, ATI Technologies, Inc., 2001; 4 pages.
RTL Code File: sq_target_instr_fetch.v, ATI Technologies, Inc., 2001; 5 pages.
RTL Code File: sq_tex_instr_queue.v, ATI Technologies, Inc., 2001; 3 pages.
RTL Code File: sq_tex_instr_seq.v, ATI Technologies, Inc., 2001; 6 pages.
RTL Code File: sq_ais_output.v, ATI Technologies, Inc., 2001; 9 pages.
RTL Code File: sq_alu_instr_queue.v, ATI Technologies, Inc., 2001; 3 pages.
RTL Code File: sq_alu_instr_seq.v, ATI Technologies, Inc., 2001; 5 pages.
RTL Code File: sp.v, ATI Technologies, Inc., Nov. 16, 2001; 5 pages.

(56) References Cited

OTHER PUBLICATIONS

RTL Code File: vector.v, ATI Technologies, Inc., Jan. 30, 2002; 6 pages.
RTL Code File: macc_gpr.v, ATI Technologies, Inc., Feb. 1, 2002; 5 pages.
RTL Code File: macc.v, ATI Technologies, Inc., Oct. 8, 2001; 8 pages.
RTL Code File: tp.v, ATI Technologies, Inc., Aug. 5, 2002; 14 pages.
Emulator Code File: sq_block_model.cpp, ATI Technologies, Inc., 2002; 13 pages.
Emulator Code File: user_block_model.h, ATI Technologies, Inc., 2002; 3 pages.
Emulator Code File: arbiter.cpp, ATI Technologies, Inc., 2002; 17 pages.
Emulator Code File: arbiter.h, ATI Technologies, Inc., 2002; 2 pages.
Emulator Code File: sq_alu.cpp, ATI Technologies, Inc., 2001; 17 pages.
Emulator Code File: sq_alu.h, ATI Technologies, Inc., 2001; 1 page.
Emulator Code File: gpr_manager.cpp, ATI Technologies, Inc., 2002; 3 pages.
Emulator Code File: gpr_manager.h, ATI Technologies, Inc., 2002; 1 page.
Emulator Code File: instruction_store.cpp, ATI Technologies, Inc., 2002; 2 pages.
Emulator Code File: instruction_store.h, ATI Technologies, Inc., 2002; 1 page.
Emulator Code File: reg_file.cpp, ATI Technologies, Inc., 2002; 1 page.
Emulator Code File: reg_file.h, ATI Technologies, Inc., 2002; 1 page.
Emulator Code File: tp.cpp, ATI Technologies, Inc., 2001; 19 pages.
Emulator Code File: tp.h, ATI Technologies, Inc., 2001; 4 pages.
Emulator Code File: sq_tp.h, ATI Technologies, Inc., 2001; 2 pages.
Emulator Code File: tp_block_model.cpp, ATI Technologies, Inc.; 2 pages.
Emulator Code File: user_block_model.h, ATI Technologies, Inc., 2002; 1 page.
Declaration of Calvin Watson, *LG Electronics v. ATI Technologies ULC*, Case No. IPR2015-00325, Sep. 9, 2015; 76 pages.
Declaration of Dr. Andrew Wolfe in Support of Reduction to Practice, *LG Electronics v. ATI Technologies ULC*, Case No. IPR2015-00325, Sep. 9, 2015; 181 pages.
R400 Shader Pipe Parts Folder History, Aug. 8, 2002 through Dec. 3, 2001; 1 page.
RTL Code File: tp_input.v, ATI Technologies, 2001; 5 pages.
*Uniram Technology, Inc. v. Taiwan Semiconductor Manufacturing Co., Ltd., et al.*, 3:04-cv-01268-VRW, Findings of Facts and Conclusions of Law, Dkt. No. 627, Apr. 14, 2008; 28 pages.
Singh, et al., "MorphoSys: An Integrated Re-configurable Architecture," RTO SCI Symposium on 'The Application of Information Technologies (Computer Science) to Mission Systems', Apr. 20-22, 1998; 11 pages.
Davila, et al., "Design and Implementation of a Rendering Algorithm in a SIMD Reconfigurable Architecture (MorphoSys)," Proceedings of the conference on Design, automation and test in Europe: Designers' forum, 2006; pp. 52-57.
Luna, Introduction to 3D Game Programming with DirectX 9.0, 2003; Figures 4.2, 5.7, pp. 94-97, 107-109.
Ahmed et al., "OpenGL—Lighting, Material, Shading and Texture Mapping," IIT Bombay, Aug. 28, 2009; 7 pages.
Excerpts from Microsoft Computer Dictionary, 5th Ed., 2002; pp. 33, 111, 276, 406, 411, 419, 423-24, 449, 578.
Excerpts from Foley et al., Fundamentals of Interactive Computer Graphics, Reading, MA: Addison-Wesley, 1984; pp. 580-582.
"S3 Graphics: DirectX 10 Architecture for Chrome 400 Series Discrete Graphics Processors," S3 Graphics White Paper, Jul. 21, 2007; 19 pages.
Excerpts from Yoo et al., Mobile 3D Graphics SoC: From Algorithm to Chip, Singapore: John Wiley & Sons, 2010; pp. 113-115.

Excerpts from IEEE 100: The Authoritative Dictionary of IEEE Standards Terms, 7th ed., New York: IEEE, 2000; pp. 47-48.
Excerpts from Dictionary of Computing, 4th ed., London: Peter Collin Publishing, 2002; p. 374.
Deposition Transcript of Nader Bagherzadeh, Ph.D., *LG Electronics v. ATI Technologies ULC*, Case No. IPR2015-00325, Aug. 14, 2015; 58 pages.
Woo, et al., "A 195/152-mW mobile multimedia SoC with fully programmable 3D graphics and MPEG4/H.264/JPEG," IEEE J. Solid-St. Circ., vol. 43, Issue 9, 2008; pp. 2047-2056.
Technical Brief, NVIDIA GeForce® GTX 200 GPU Architectural Overview, May 2008; 23 pages.
Intel® Processor Graphics DirectX Developer's Guide, Intel Corporation, 2008-2010; 38 pages.
"The Rise of Mobile Gaming on Android: Qualcomm® Snapdragon™ Technology Leadership," Qualcomm Technologies, Inc., 2014; 22 pages.
Declaration of Dr. Andrew Wolfe in Support of the Patent Owner Response, *LG Electronics v. ATI Technologies ULC*, Case No. IPR2015-00325, Sep. 9, 2015; 108 pages.
Excerpts from Ball, Embedded Microprocessor Systems: Real World Design, 3rd ed., New York: Elsevier Science, 2002; p. 278.
Deposition Transcript of Raymond Vargas, *LG Electronics v. ATI Technologies ULC*, Case No. IPR2015-00325, Dec. 16, 2015; 134 pages.
Teleconference Transcript, *LG Electronics v. ATI Technologies ULC*, Case No. IPR2015-00325, Dec. 14, 2015; 23 pages.
Patent Owner Revised Demonstrative Exhibits, *LG Electronics v. ATI Technologies ULC*, Case Nos. IPR2015-00325, -00326, and -00330, Feb. 10, 2016; 71 pages.
Definition of "thread", Microsoft Computer Dictionary, 5th Edition, Redmond, WA: Microsoft, 2002; p. 518.
E-mail Exchange between Patent Trial and Appeal Board and Counsel, *LG Electronics v. ATI Technologies ULC*, Case No. IPR2015-00325, Feb. 5 through Feb. 9, 2016; 4 pages.
Prosecution History of U.S. Pat. No. 6,897,871, U.S. Appl. No. 10/718,318, filed Nov. 20, 2003; 55 pages.
Declaration of Nader Bagherzadeh, *LG Electronics v. ATI Technologies ULC*, Case No. IPR2015-00326, Dec. 10, 2014; 112 pages.
Petitioner's Hearing Demonstratives, *LG Electronics v. ATI Technologies ULC*, Case No. IPR2015-00326, filed Apr. 6, 2016; 17 pages.
Prosecution History of U.S. Pat. No. 7,327,369, U.S. Appl. No. 11/117,863, filed Apr. 29, 2005; 116 pages.
Declaration of Nader Bagherzadeh, *LG Electronics v. ATI Technologies ULC*, Case No. IPR2015-00330, Dec. 10, 2014; 86 pages.
Segal, et al., "The OpenGL Graphics System: A Specification (Version 1.4)," Silicon Graphics 1992-2002; 312 pages.
OpenGL Overview, accessed Nov. 23, 2014, https://www.opengl.org/about/#1; 1 page.
Declaration of Raymond Vargas, *LG Electronics v. ATI Technologies ULC*, Case No. IPR2015-00330, Jan. 11, 2016; 26 pages.
Declaration of Calvin Watson, *LG Electronics v. ATI Technologies ULC*, Case No. IPR2015-00326, Oct. 15, 2015; 76 pages.
Declaration of Calvin Watson, *LG Electronics v. ATI Technologies ULC*, Case No. IPR2015-00330, Oct. 15, 2015; 76 pages.
Declaration of Andrew Wolfe, *LG Electronics v. ATI Technologies ULC*, Case No. IPR2015-00326, Oct. 14, 2015; 271 pages.
Declaration of Andrew Wolfe, *LG Electronics v. ATI Technologies ULC*, Case No. IPR2015-00330, Oct. 14, 2015; 139 pages.
Declaration of Laurent Lefebvre, *LG Electronics v. ATI Technologies ULC*, Case No. IPR2015-00326, filed Oct. 9, 2015; 66 pages.
Declaration of Laurent Lefebvre, *LG Electronics v. ATI Technologies ULC*, Case No. IPR2015-00330, filed Oct. 9, 2015; 66 pages.
GPU Programming Guide GeForce 8 and 9 Series, NVIDIA, Dec. 19, 2008; 65 pages.
Excerpt from the Oxford Dictionary of Usage and Style, 2000; p. 27.
Gruber et al., "R400 Shader Processor 1.2," ATI Technologies 2001, Oct. 9, 2015; 43 pages.
Deposition Transcript of Nader Bagherzadeh, *LG Electronics v. ATI Technologies ULC*, Case Nos. IPR2015-00326 and IPR2015-00330, Sep. 15, 2015; 53 pages.
U.S. Appl. No. 10/718,318, filed Nov. 20, 2003; 24 pages.

(56) References Cited

OTHER PUBLICATIONS

Singer, "History of the Modern Graphics Processor, Part 3," Apr. 10, 2013; 15 pages.
Luebke et al., "How GPUs Work," IEEE Computer 96-100, 2007; 5 pages.
Microsoft and ATI Technologies Announce Technology Development Agreement, Microsoft, Aug. 13, 2003; 4 pages.
Shilov, "ATI and NVIDIA Proclaim Different Graphics Processors Architecture Goals: ATI Says Unified Rendering Engine—The Way To Go, NVIDIA Disagrees," Dec. 23, 2004; 3 pages.
Shilov, "NVIDIA Chief Architect: Unified Pixel and Vertex Pipelines—The Way to Go. NVIDIA Says It Would Make a Chip with Unified Pipes 'When it Makes Sense'," Xbit, Jul. 11, 2005; 2 pages.
RTL Code File: sq_input_arb.v, ATI Technologies, Inc., 2001; 3 pages.
RTL Code File: sq_export_alloc.v, ATI Technologies, Inc., 2001; 5 pages.
RTL Code File: export_control.v, ATI Technologies, Inc., Apr. 4, 2002; 25 pages.
RTL Code File: macc32.mc, ATI Technologies, Inc., Jan. 28, 2002; 2 pages.
RTL Code File: sx.v, ATI Technologies, Inc., Mar. 21, 2002; 7 pages.
RTL Code File: parameter_caches.v, Mar. 26, 2002; 5 pages.
RTL Code File: param_cache_ctl.v, ATI Technologies, Inc., Mar. 26, 2002; 4 pages.
RTL Code File: export_buffers.v, ATI Technologies, Inc., Apr. 16, 2002; 21 pages.
RTL Code File: pa.v, ATI Technologies, Inc., Mar. 17, 2002; 16 pages.
RTL Code File: pa_ag.v, ATI Technologies, Inc., 2001; 31 pages.
RTL Code File: pa_sxifccg.v, ATI Technologies, Inc., 2002; 8 pages.
RTL Code File: pa_ccg_sxifsm.v, ATI Technologies, Inc., 2002; 12 pages.
RTL Code File: sc.v, ATI Technologies, Inc., Mar. 17, 2002; 22 pages.
Takahashi, "The Xbox 360 Uncloaked: The Real Story Behind Microsoft's Next-Generation Video Game Console," SpiderWorks 2006; 9 pages.
Microsoft Corporation's Annual Report, 2006; 73 pages.
Deposition Transcript of Raymond Vargas, *LG Electronics v. ATI Technologies ULC*, Case Nos. IPR2015-00326 and IPR2015-00330, Feb. 5, 2016; 71 pages.
Patent Owner's Sur-Reply to Petitioner's Reply, Case No. IPR2015-00325, filed Dec. 23, 2015; 14 pages.
Transcript of Teleconference, *LG Electronics v. ATI Technologies ULC*, Case Nos. IPR2015-00326 and IPR2015-00330, Feb. 3, 2016; 25 pages.
Patent Owner's Demonstratives, *LG Electronics v. ATI Technologies ULC*, Case No. IPR2015-00326, Apr. 4, 2016; 49 pages.
Declaration of Mr. Jamie B. Beaber in Support of Motions for Pro Hac Vice Admission, *LG Electronics v. ATI Technologies ULC*, Case No. IPR2015-00325, Feb. 5, 2015; 4 pages.
Declaration of Mr. Michael Maas in Support of Motions for Pro Hac Vice Admission, *LG Electronics v. ATI Technologies ULC*, Case No. IPR2015-00325, Feb. 5, 2015; 3 pages.
Declaration of Raymond Vargas, *LG Electronics v. ATI Technologies ULC*, Case No. IPR2015-00326, Jan. 11, 2016; 26 pages.
Curriculum Vitae of Ray Vargas, *LG Electronics v. ATI Technologies ULC*, Case No. IPR2015-00325, Dec. 3, 2015; 4 pages.
Curriculum Vitae of Andrew Wolfe, Ph.D., *LG Electronics v. ATI Technologies ULC*, Case No. IPR2015-00325, Sep. 9, 2015; 5 pages.
Power of Attorney, *LG Electronics v. ATI Technologies ULC*, Case No. IPR2015-000325, Dec. 10, 2014; 2 pages.
ATI Technologies ULC's Power of Attorney, *LG Electronics v. ATI Technologies ULC*, Case No. IPR2015-00325, Dec. 30, 2014; 3 pages.
Patent Owner's Mandatory Notices Pursuant to 37 C.F.R. 42.8(a)(2), *LG Electronics v. ATI Technologies ULC*, Case No. IPR2015-00325, Dec. 30, 2014; 4 pages.

Notice of Filing Date Accorded to Petition and Time for Filing Patent Owner Preliminary Response, *LG Electronics v. ATI Technologies ULC*, Case No. IPR2015-00325, Jan. 12, 2015; 4 pages.
ATI Technologies ULC's Updated Mandatory Notices Pursuant to 37 C.F.R. 42.8(a)(3) and (b)(3), *LG Electronics v. ATI Technologies ULC*, Case No. IPR2015-00325, Jan. 28, 2015; 4 pages.
Petitioner's Motion to Pro Hac Vice Admission of Jamie B. Beaber Pursuant to 37 C.F.R. 42.10(c), *LG Electronics v. ATI Technologies ULC*, Case No. IPR2015-00325, Feb. 5, 2015; 7 pages.
Petitioner's Motion to Pro Hac Vice Admission of Michael Maas Pursuant to 37 C.F.R. 42.10(c), *LG Electronics v. ATI Technologies ULC*, Case No. IPR2015-00325, Feb. 5, 2015; 7 pages.
Decision Granting Petitioner's Motions for Pro Hac Vice Admission of Jamie B. Beaber and Michael Maas, *LG Electronics v. ATI Technologies ULC*, Case No. IPR2015-00325, Feb. 19, 2015; 4 pages.
Petitioner's Updated Power of Attorney, *LG Electronics v. ATI Technologies ULC*, Case No. IPR2015-00325, Feb. 26, 2015; 3 pages.
Petitioner's Updated Mandatory Notices Under 37 C.F.R. 42.8, *LG Electronics v. ATI Technologies ULC*, Case No. IPR2015-00325, Feb. 26, 2015; 5 pages.
Scheduling Order, *LG Electronics v. ATI Technologies ULC*, Case No. IPR2015-00325, Jun. 15, 2015; 8 pages.
ATI Technologies ULC's Notice of Deposition of Dr. Nader Bagherzadeh, *LG Electronics v. ATI Technologies ULC*, Case No. IPR2015-00325, Jul. 20, 2015; 3 pages.
Notice of Joint Stipulation to Modify Trial Due Dates 1 and 2, *LG Electronics v. ATI Technologies ULC*, Case No. IPR2015-00325, Jul. 26, 2015; 4 pages.
ATI Technologies ULC's Updated Mandatory Notices Pursuant to 37 C.F.R. 42.8(a)(3) and (b)(3), *LG Electronics v. ATI Technologies ULC*, Case No. IPR2015-00325, Jul. 28, 2015; 4 pages.
ATI Technologies ULC's Revised Notice of Deposition of Dr. Nader Bagherzadeh, *LG Electronics v. ATI Technologies ULC*, Case No. IPR2015-00325, Aug. 7, 2015; 3 pages.
Patent Owner's Motion to Seal Documents, *LG Electronics v. ATI Technologies ULC*, Case No. IPR2015-00325, Sep. 9, 2015; 7 pages.
Motion to Enter Protective Order, *LG Electronics v. ATI Technologies ULC*, Case No. IPR2015-00325, Sep. 9, 2015; 10 pages.
Petitioner's Objections to Evidence Under 37 C.F.R. 42.64(b)(1), *LG Electronics v. ATI Technologies ULC*, Case No. IPR2015-00325, Sep. 16, 2015; 17 pages.
Petitioner's Updated Mandatory Notices Under 37 C.F.R. 42.8, *LG Electronics v. ATI Technologies ULC*, Case No. IPR2015-00325, Oct. 6, 2015; 5 pages.
LG's Opposition to Patent Owner's Motion to Seal Documents, *LG Electronics v. ATI Technologies ULC*, Case No. IPR2015-00325, Oct. 9, 2015; 11 pages.
Petitioner's Notice of Deposition of Patent Owner's Witnesses, *LG Electronics v. ATI Technologies ULC*, Case No. IPR2015-00325, Oct. 29, 2015; 4 pages.
Notice of Joint Stipulation to Modify Trial Due Dates 2 and 4, *LG Electronics v. ATI Technologies ULC*, Case No. IPR2015-00325, Oct. 29, 2015; 4 pages.
Petitioner's Updated Mandatory Notices Under 37 C.F.R. 42.8, *LG Electronics v. ATI Technologies ULC*, Case No. IPR2015-00325, Nov. 3, 2015; 6 pages.
Patent Owner's Reply to Petitioner's Opposition to Patent Owner's Motion to Seal, *LG Electronics v. ATI Technologies ULC*, Case No. IPR2015-00325, Nov. 9, 2015; 8 pages.
Petitioner's Motion to Seal Certain ATI Documents, *LG Electronics v. ATI Technologies ULC*, Case No. IPR2015-000325, Dec. 3, 2015; 11 pages.
ATI Technologies ULC's Notice of Deposition of Raymond Vargas, *LG Electronics v. ATI Technologies ULC*, Case No. IPR2015-00325, Dec. 8, 2015; 3 pages.
Patent Owner's Objections to Evidence Pursuant to 37 C.F.R. 42.64(b)(1), *LG Electronics v. ATI Technologies ULC*, Case No. IPR2015-00325, Dec. 10, 2015; 4 pages.
Order—Conduct of the Proceeding, *LG Electronics v. ATI Technologies ULC*, Case No. IPR2015-00325, Dec. 15, 2015; 6 pages.

(56) References Cited

OTHER PUBLICATIONS

Patent Owner's Motion to Seal Documents, *LG Electronics v. ATI Technologies ULC*, Case No. IPR2015-00325, Dec. 23, 2015; 6 pages.
Patent Owner's Request for Oral Argument, *LG Electronics v. ATI Technologies ULC*, Case No. IPR2015-00325, Jan. 15, 2016; 4 pages.
Patent Owner's Motion to Seal Documents, *LG Electronics v. ATI Technologies ULC*, Case No. IPR2015-00325, Jan. 15, 2016; 5 pages.
Patent Owner's Motion for Observation on Cross Examination of Petitioner's Reply Witness Mr. Raymond Vargas, *LG Electronics v. ATI Technologies ULC*, Case No. IPR2015-00325, Jan. 15, 2016; 8 pages.
Petitioner's Request for Oral Argument, *LG Electronics v. ATI Technologies ULC*, Case No. IPR2015-00325, Jan. 15, 2016; 4 pages.
Petitioner's Motion to Exclude Evidence, *LG Electronics v. ATI Technologies ULC*, Case No. IPR2015-00325, Jan. 15, 2016; 17 pages.
Patent Owner's Opposition to Petitioner's Motion to Exclude, *LG Electronics v. ATI Technologies ULC*, Case No. IPR2015-00325, Jan. 20, 2016; 18 pages.
Petitioner's Motion to Seal, *LG Electronics v. ATI Technologies ULC*, Case No. IPR2015-00325, Jan. 20, 2016; 5 pages.
Petitioner's Response to Patent Owner's Motion for Observation on Cross Examination, *LG Electronics v. ATI Technologies ULC*, Case No. IPR2015-00325, Jan. 20, 2016; 9 pages.
Order—Oral Hearing, *LG Electronics v. ATI Technologies ULC*, Case No. IPR2015-00325, Jan. 22, 2016; 7 pages.
Order—Conduct of the Proceeding, *LG Electronics v. ATI Technologies ULC*, Case No. IPR2015-00325, Jan. 25, 2016; 6 pages.
Petitioner's Updated Exhibit List, *LG Electronics v. ATI Technologies ULC*, Case No. IPR2015-00325, Jan. 26, 2016; 6 pages.
Petitioner's Reply to Opposition to Motion to Exclude, *LG Electronics v. ATI Technologies ULC*, Case No. IPR2015-00325, Jan. 27, 2016; 8 pages.
Petitioner's Hearing Demonstratives, *LG Electronics v. ATI Technologies ULC*, Case No. IPR2015-00325, Feb. 5, 2016; 23 pages.
Patent Owner's Demonstrative Exhibits, *LG Electronics v. ATI Technologies ULC*, Case No. IPR2015-00325, Feb. 5, 2016; 74 pages.
Patent Owner's Updated Exhibit List, *LG Electronics v. ATI Technologies ULC*, Case No. IPR2015-00325, Feb. 8, 2016; 8 pages.
Petitioner's Updated Exhibit List, *LG Electronics v. ATI Technologies ULC*, Case No. IPR2015-00325, Feb. 9, 2016; 6 pages.
Patent Owner's Updated Exhibit List, *LG Electronics v. ATI Technologies ULC*, Case No. IPR2015-00325, Feb. 9, 2016; 8 pages.
Order—Conduct of the Proceeding, *LG Electronics v. ATI Technologies ULC*, Case No. IPR2015-00325, Feb. 11, 2016; 4 pages.
Oral Hearing Transcript, *LG Electronics v. ATI Technologies ULC*, Case No. IPR2015-00325, Apr. 8, 2016; 83 pages.
Decision Denying ATI's Motions to Seal, *LG Electronics v. ATI Technologies ULC*, Case No. IPR2015-00325, Apr. 14, 2016; 9 pages.
Decision Denying LG's Motion to Seal, *LG Electronics v. ATI Technologies ULC*, Case No. IPR2015-00325, Apr. 14, 2016; 3 pages.
Patent Owner's Demonstrative Exhibits, *LG Electronics v. ATI Technologies ULC*, Case Nos. IPR2015-00325, -00326, and -00330, Feb. 10, 2016; 71 pages.
Response to Petitioner's Objections to Evidence, *LG Electronics v. ATI Technologies ULC*, Case No. IPR2015-00325, Sep. 30, 2015; 8 pages.
Supplemental Declaration of Dr. Andrew Wolfe, *LG Electronics v. ATI Technologies ULC*, Case No. IPR2015-00325, Sep. 29, 2016; 3 pages.
Power of Attorney, *LG Electronics v. ATI Technologies ULC*, Case No. IPR2015-00326, Dec. 10, 2014; 2 pages.

ATI Technologies ULC's Power of Attorney, *LG Electronics v. ATI Technologies ULC*, Case No. IPR2015-00326, Dec. 30, 2014; 3 pages.
Patent Owner's Mandatory Notices Pursuant to 37 C.F.R. 42.8(a)(2), *LG Electronics v. ATI Technologies ULC*, Case No. IPR2015-00326, Dec. 30, 2014; 4 pages.
Notice of Filing Date Accorded to Petition and Time for Filing Patent Owner Preliminary Response, *LG Electronics v. ATI Technologies ULC*, Case No. IPR2015-00326, Jan. 12, 2015; 4 pages.
Petitioner's Motion to Pro Hac Vice Admission of Jamie B. Beaber Pursuant to 37 C.F.R. 42.10(c), *LG Electronics v. ATI Technologies ULC*, Case No. IPR2015-00326, Feb. 5, 2015; 7 pages.
Petitioner's Motion to Pro Hac Vice Admission of Michael Maas Pursuant to 37 C.F.R. 42.10(c), *LG Electronics v. ATI Technologies ULC*, Case No. IPR2015-00326, Feb. 5, 2015; 7 pages.
Decision Granting Petitioner's Motions for Pro Hac Vice Admission of Jamie B. Beaber and Michael Maas, *LG Electronics v. ATI Technologies ULC*, Case No. IPR2015-00326, Feb. 19, 2015; 4 pages.
Petitioner's Updated Power of Attorney, *LG Electronics v. ATI Technologies ULC*, Case No. IPR2015-00326, Feb. 26, 2015; 3 pages.
Petitioner's Updated Mandatory Notices Under 37 C.F.R. 42.8, *LG Electronics v. ATI Technologies ULC*, Case No. IPR2015-00326, Feb. 26, 2015; 5 pages.
ATI Technologies ULC's Updated Mandatory Notices Pursuant to 37 C.F.R. 42.8(a)(3) and (b)(3), *LG Electronics v. ATI Technologies ULC*, Case No. IPR2015-00326, Apr. 10, 2015; 4 pages.
Scheduling Order, *LG Electronics v. ATI Technologies ULC*, Case No. IPR2015-00326, Jul. 10, 2015; 7 pages.
Petitioner's Request for Rehearing Under 37 C.F.R. 42.71(c) and (d), *LG Electronics v. ATI Technologies ULC*, Case No. IPR2015-00326, Jul. 24, 2015; 17 pages.
ATI Technologies ULC's Notice of Deposition of Dr. Nader Bagherzadeh, *LG Electronics v. ATI Technologies ULC*, Case No. IPR2015-00326, Aug. 4, 2015; 3 pages.
Decision on Request for Rehearing, *LG Electronics v. ATI Technologies ULC*, Case No. IPR2015-00326, Sep. 2, 2015; 6 pages.
Joint Notice of Stipulation to Modify Trial Due Dates 1 and 2, *LG Electronics v. ATI Technologies ULC*, Case No. IPR2015-00326, Oct. 8, 2015; 4 pages.
Patent Owner's Motion to Seal Documents, *LG Electronics v. ATI Technologies ULC*, Case No. IPR2015-00326, Oct. 15, 2015; 18 pages.
Petitioner's Objections to Evidence Under 37 C.F.R. 42.64(b)(1), *LG Electronics v. ATI Technologies ULC*, Case No. IPR2015-00326, Oct. 22, 2015; 14 pages.
Petitioner's Notice of Deposition of Patent Owner's Witnesses, *LG Electronics v. ATI Technologies ULC*, Case No. IPR2015-00326, Oct. 29, 2015; 4 pages.
Petitioner's Updated Mandatory Notices Under 37 C.F.R. 42.8, *LG Electronics v. ATI Technologies ULC*, Case No. IPR2015-00326, Nov. 3, 2015; 6 pages.
LG's Opposition to Patent Owner's Motion to Seal Documents, *LG Electronics v. ATI Technologies ULC*, Case No. IPR2015-00326, Nov. 16, 2015; 9 pages.
Patent Owner's Reply to Petitioner's Opposition to the Motion to Seal Documents, *LG Electronics v. ATI Technologies ULC*, Case No. IPR2015-00326, Dec. 16, 2015; 7 pages.
Petitioner's Motion to Seal Documents, *LG Electronics v. ATI Technologies ULC*, Case No. IPR2015-00326, Jan. 11, 2016; 10 pages.
Patent Owner's Objections to Evidence Pursuant to 37 C.F.R. 42.64(b)(1), *LG Electronics v. ATI Technologies ULC*, Case No. IPR2015-00326, Jan. 19, 2016; 3 pages.
ATI Technologies ULC's Notice of Deposition of Raymond Vargas, *LG Electronics v. ATI Technologies ULC*, Case No. IPR2015-00326, Feb. 1, 2016; 3 pages.
Authorization for Sur-Reply or Motion for Observations on Cross Examination, *LG Electronics v. ATI Technologies ULC*, Case No. IPR2015-00326, Feb. 4, 2016; 5 pages.

(56) References Cited

OTHER PUBLICATIONS

Patent Owner's Demonstrative Exhibits, *LG Electronics v. ATI Technologies ULC*, Case No. IPR2015-00326, Feb. 5, 2016; 74 pages.
Patent Owner's Updated Exhibit List, *LG Electronics v. ATI Technologies ULC*, Case No. IPR2015-00326, Feb. 8, 2016; 8 pages.
Patent Owner's Updated Exhibit List, *LG Electronics v. ATI Technologies ULC*, Case No. IPR2015-00326, Feb. 9, 2016; 8 pages.
Patent Owner's Sur-Reply to Petitioner's Reply, *LG Electronics v. ATI Technologies ULC*, Case No. IPR2015-00326, Feb. 9, 2016; 11 pages.
Order—Conduct of the Proceeding, *LG Electronics v. ATI Technologies ULC*, Case No. IPR2015-00326, Feb. 11, 2016; 4 pages.
Petitioner's Request for Oral Argument, *LG Electronics v. ATI Technologies ULC*, Case No. IPR2015-00326, Mar. 2, 2016; 4 pages.
Patent Owner's Request for Oral Argument, *LG Electronics v. ATI Technologies ULC*, Case No. IPR2015-00326, Mar. 2, 2016; 4 pages.
Petitioner's Motion to Exclude Evidence, *LG Electronics v. ATI Technologies ULC*, Case No. IPR2015-00326, Mar. 2, 2016; 18 pages.
Patent Owner's Opposition to Petitioner's Motion to Exclude, *LG Electronics v. ATI Technologies ULC*, Case No. IPR2015-00326, Mar. 16, 2016; 19 pages.
Order—Trial Hearing, *LG Electronics v. ATI Technologies ULC*, Case No. IPR2015-00326, Mar. 22, 2016; 5 pages.
Petitioner's Reply to Opposition to Motion to Exclude, *LG Electronics v. ATI Technologies ULC*, Case No. IPR2015-00326, Mar. 23, 2016; 8 pages.
Petitioner's Updated Exhibit List, *LG Electronics v. ATI Technologies ULC*, Case No. IPR2015-00326, Apr. 4, 2016; 6 pages.
Patent Owner's Updated Exhibit List, *LG Electronics v. ATI Technologies ULC*, Case No. IPR2015-00326, Apr. 4, 2016; 8 pages.
Record of Oral Hearing, *LG Electronics v. ATI Technologies ULC*, Case Nos. IPR2015-00325, -00326, and -00330, Apr. 13, 2016; 83 pages.
Record of Oral Hearing, *LG Electronics v. ATI Technologies ULC*, Case No. IPR2015-00326, May 16, 2016; 40 pages.
Patent Owner's Demonstrative Exhibits, *LG Electronics v. ATI Technologies ULC*, Case No. IPR2015-00326, Feb. 3, 2016; 74 pages.
Power of Attorney, *LG Electronics v. ATI Technologies ULC*, Case No. IPR2015-00330, Nov. 26, 2014; 2 pages.
ATI Technologies ULC's Power of Attorney, *LG Electronics v. ATI Technologies ULC*, Case No. IPR2015-00330, Dec. 30, 2013; 3 pages.
Patent Owner's Mandatory Notices Pursuant to 37 C.F.R. 42.8(a)(2), *LG Electronics v. ATI Technologies ULC*, Case No. IPR2015-00330, Dec. 30, 2014; 4 pages.
Notice of Filing Date Accorded to Petition and Time for Filing Patent Owner Preliminary Response, *LG Electronics v. ATI Technologies ULC*, Case No. IPR2015-00330, Jan. 12, 2015; 4 pages.
Petitioner's Motion for Pro Hac Vice Admission of Jamie B. Beaber Pursuant to 37 C.F.R. 42.10(c), *LG Electronics v. ATI Technologies ULC*, Case No. IPR2015-00330, Feb. 5, 2015; 7 pages.
Petitioner's Motion for Pro Hac Vice Admission of Michael Maas Pursuant to 37 C.F.R. 42.10(c), *LG Electronics v. ATI Technologies ULC*, Case No. IPR2015-00330, Feb. 5, 2015; 7 pages.
Decision Granting Petitioner's Motions for Pro Hac Vice Admission of Jaime B. Beaber and Michael Maas, *LG Electronics v. ATI Technologies ULC*, Case Nos. IPR2015-00321-00322-00325-00326-00327 and -00330, Feb. 19, 2015; 4 pages.
Petitioner's Updated Power of Attorney, *LG Electronics v. ATI Technologies ULC*, Case No. IPR2015-00330, Feb. 26, 2015; 3 pages.
Petitioner's Updated Mandatory Notices Under 37 C.F.R. 42.8, *LG Electronics v. ATI Technologies ULC*, Case No. IPR2015-00330, Feb. 26, 2015; 5 pages.

ATI Technologies ULC's Updated Mandatory Notices Pursuant to 37 C.F.R. 42.8(a)(3) and (b)(3), *LG Electronics v. ATI Technologies ULC*, Case No. IPR2015-00330, Apr. 10, 2015; 4 pages.
Scheduling Order, *LG Electronics v. ATI Technologies ULC*, Case Nos. IPR2015-00326 and -00330, Jul. 10, 2015; 7 pages.
Petitioner's Request for Rehearing Under 37 C.F.R. 42.71(c) and (d), *LG Electronics v. ATI Technologies ULC*, Case No. IPR2015-00330, Jul. 24, 2015; 16 pages.
ATI Technologies ULC's Notice of Deposition of Dr. Nader Bagherzadeh, *LG Electronics v. ATI Technologies ULC*, Case No. IPR2015-00330, Aug. 4, 2015; 3 pages.
Decision Denying Request for Rehearing, *LG Electronics v. ATI Technologies ULC*, Case No. IPR2015-00330, Sep. 2, 2015; 5 pages.
Joint Notice of Stipulation to Modify Trial Due Dates 1 and 2, *LG Electronics v. ATI Technologies ULC*, Case No. IPR2015-00330, Oct. 8, 2015; 4 pages.
Patent Owner's Motion to Seal Documents, *LG Electronics v. ATI Technologies ULC*, Case No. IPR2015-00330, Oct. 15, 2015; 18 pages.
Petitioner's Objections to Evidence Under 37 C.F.R. 42.64(b)(1), *LG Electronics v. ATI Technologies ULC*, Case No. IPR2015-00330, Oct. 22, 2015; 14 pages.
Petitioner's Notice of Deposition of Patent Owner's Witnesses, *LG Electronics v. ATI Technologies ULC*, Case No. IPR2015-00330, Oct. 29, 2015; 4 pages.
Petitioner's Updated Mandatory Notices Under 37 C.F.R. 42.8, *LG Electronics v. ATI Technologies ULC*, Case No. IPR2015-00330, Nov. 3, 2015; 6 pages.
LG's Opposition to Patent Owner's Motion to Seal Documents, *LG Electronics v. ATI Technologies ULC*, Case No. IPR2015-00330, Nov. 16, 2015; 9 pages.
Patent Owner's Reply to Petitioner's Opposition to the Motion to Seal Documents, *LG Electronics v. ATI Technologies ULC*, Case No. IPR2015-00330, Dec. 16, 2015; 7 pages.
Petitioner's Motion to Seal Documents, *LG Electronics v. ATI Technologies ULC*, Case No. IPR2015-00330, Jan. 11, 2016; 10 pages.
Patent Owner's Objections to Evidence Pursuant to 37 C.F.R. 42.64(b)(1), *LG Electronics v. ATI Technologies ULC*, Case No. IPR2015-00330, Jan. 19, 2016; 3 pages.
ATI Technologies ULC's Notice of Deposition of Raymond Vargas, *LG Electronics v. ATI Technologies ULC*, Case No. IPR2015-00330, Feb. 1, 2016; 3 pages.
Authorization for Sur-Reply or Motion for Observations on Cross Examination, *LG Electronics v. ATI Technologies ULC*, Case Nos. IPR2015-00326 and -00330, Feb. 4, 2016; 5 pages.
Patent Owner's Demonstrative Exhibits, *LG Electronics v. ATI Technologies ULC*, Case No. IPR2015-00330, Feb. 10, 2016; 74 pages.
Patent Owner's Updated Exhibit List, *LG Electronics v. ATI Technologies ULC*, Case No. IPR2015-00330, Feb. 8, 2016; 8 pages.
Patent Owner's Updated Exhibit List, *LG Electronics v. ATI Technologies ULC*, Case No. IPR2015-00330, Feb. 9, 2016; 8 pages.
Patent Owner's Sur-Reply to Petitioner's Reply, *LG Electronics v. ATI Technologies ULC*, Case No. IPR2015-00330, Feb. 9, 2016; 11 pages.
Order—Conduct of the Proceeding, *LG Electronics v. ATI Technologies ULC*, Case Nos. IPR2015-00325 -00326 and -00330, Feb. 11, 2016; 4 pages.
Petitioner's Motion to Exclude Evidence, *LG Electronics v. ATI Technologies ULC*, Case No. IPR2015-00330, Mar. 2, 2016; 18 pages.
Patent Owner's Opposition to Petitioner's Motion to Exclude, *LG Electronics v. ATI Technologies ULC*, Case No. IPR2015-00330, Mar. 16, 2016; 19 pages.
Petitioner's Reply to Opposition to Motion to Exclude, *LG Electronics v. ATI Technologies ULC*, Case No. IPR2015-00330, Mar. 23, 2016; 8 pages.
Patent Owner's Demonstrative Exhibits, *LG Electronics v. ATI Technologies ULC*, Case No. IPR2015-00330, Feb. 3, 2016; 74 pages.

(56) References Cited

OTHER PUBLICATIONS

ATI Technologies ULC's Updated Mandatory Notices Pursuant to 37 C.F.R. 42.8(a)(3) and (b)(3), *LG Electronics, Inc.* v. *ATI Technologies ULC*, IPR2015-00325, Jun. 15, 2016; 4 pages.
Updated Power of Attorney, *LG Electronics, Inc.* v. *ATI Technologies ULC*, IPR2015-00325, Jun. 15, 2016; 3 pages.
Power of Attorney, *LG Electronics, Inc.* v. *ATI Technologies ULC*, IPR2015-00327, Dec. 10, 2014; 2 pages.
Petition for Inter Partes Review of U.S. Pat. No. 6,897,871, *LG Electronics, Inc.* v. *ATI Technologies ULC*, IPR2015-00327, Dec. 10, 2014; 66 pages.
ATI Technologies ULC's Power of Attorney Pursuant to 37 C.F.R. 42.10(b), *LG Electronics, Inc.* v. *ATI Technologies ULC*, IPR2015-00327, Dec. 30, 2014; 3 pages.
Patent Owner Mandatory Notices Pursuant to 37 C.F.R. 42.8(a)(2), *LG Electronics, Inc.* v. *ATI Technologies ULC*, IPR2015-00327, Dec. 30, 2014; 4 pages.
Notice of Filing Date Accorded to Petition and Time for Filing Patent Owner Preliminary Response, *LG Electronics, Inc.* v. *ATI Technologies ULC*, IPR2015-00327, Jan. 12, 2015; 4 pages.
Petitioner's Motion for Pro Hac Vice Admission of Jamie B. Beaber Pursuant to 37 C.F.R. 42.10(c), *LG Electronics, Inc.* v. *ATI Technologies ULC*, IPR2015-00327, Feb. 5, 2015; 7 pages.
Petitioner's Motion for Pro Hac Vice Admission of Michael Maas Pursuant to 37 C.F.R. 42.10(c), *LG Electronics, Inc.* v. *ATI Technologies ULC*, IPR2015-00327, Feb. 5, 2015; 7 pages.
Decision Granting Petitioner's Motions for Pro Hac Vice Admission of Jamie B. Beaber and Michael M. Maas, *LG Electronics, Inc.* v. *ATI Technologies ULC*, IPR2015-00327, Feb. 19, 2015; 4 pages.
Petitioner's Updated Power of Attorney, *LG Electronics, Inc.* v. *ATI Technologies ULC*, IPR2015-00327, Feb. 26, 2015; 3 pages.
Petitioner's Updated Mandatory Notices Under 37 C.F.R. 42.8, *LG Electronics, Inc.* v. *ATI Technologies ULC*, IPR2015-00327, Feb. 26, 2015; 5 pages.
ATI Technologies ULC's Updated Mandatory Notices Pursuant to 37 C.F.R. 42.8(a)(3) and (b)(3), *LG Electronics, Inc.* v. *ATI Technologies ULC*, IPR2015-00327, Apr. 10, 2015; 4 pages.
Patent Owner ATI Technologies ULC's Preliminary Response Pursuant to 37 C.F.R. 42.107, *LG Electronics, Inc.* v. *ATI Technologies ULC*, IPR2015-00327, Apr. 13, 2015; 42 pages.
Decision Denying Institution of Inter Partes Review, *LG Electronics, Inc.* v. *ATI Technologies ULC*, IPR2015-00327, Jul. 10, 2015; 13 pages.
Petitioner's Request for Rehearing Under 37 C.F.R. 42.71(c) and (d), *LG Electronics, Inc.* v. *ATI Technologies ULC*, IPR2015-00327, Aug. 10, 2015; 12 pages.
Decision Denying Request for Rehearing, *LG Electronics, Inc.* v. *ATI Technologies ULC*, IPR2015-00327, Sep. 2, 2015; 6 pages.
Petitioner's Request for Refund of Post-Institution Fees, *LG Electronics, Inc.* v. *ATI Technologies ULC*, IPR2015-00327, Nov. 2, 2015; 4 pages.
Notice of Refund, *LG Electronics, Inc.* v. *ATI Technologies ULC*, IPR2015-00327, Nov. 3, 2015; 2 pages.
Declaration of Dr. Nader Bagherzadeh, *LG Electronics, Inc.* v. *ATI Technologies ULC*, IPR2015-00327, Dec. 10, 2014; 105 pages.
Petitioner's Notice of Appeal, *LG Electronics* v. *ATI Technologies ULC*, Case No. IPR2015-00326, Jul. 15, 2016; 26 pages.
ATI Technologies ULC's Updated Mandatory Notices, *LG Electronics* v. *ATI Technologies ULC*, Case No. IPR2015-00326, Jul. 29, 2016; 4 pages.
ATI Technologies ULC's Updated Power of Attorney, *LG Electronics* v. *ATI Technologies ULC*, Case No. IPR2015-00326, Jul. 29, 2016; 3 pages.
Patent Owner's Notice of Cross-Appeal, *LG Electronics* v. *ATI Technologies ULC*, Case No. IPR2015-00326, Jul. 29, 2016; 6 pages.
ATI Technologies ULC's Updated Mandatory Notices, *LG Electronics* v. *ATI Technologies ULC*, Case No. IPR2015-00330, Sep. 2, 2016; 4 pages.
ATI Technologies ULC's Updated Power of Attorney, *LG Electronics* v. *ATI Technologies ULC*, Case No. IPR2015-00330, Sep. 2, 2016; 3 pages.

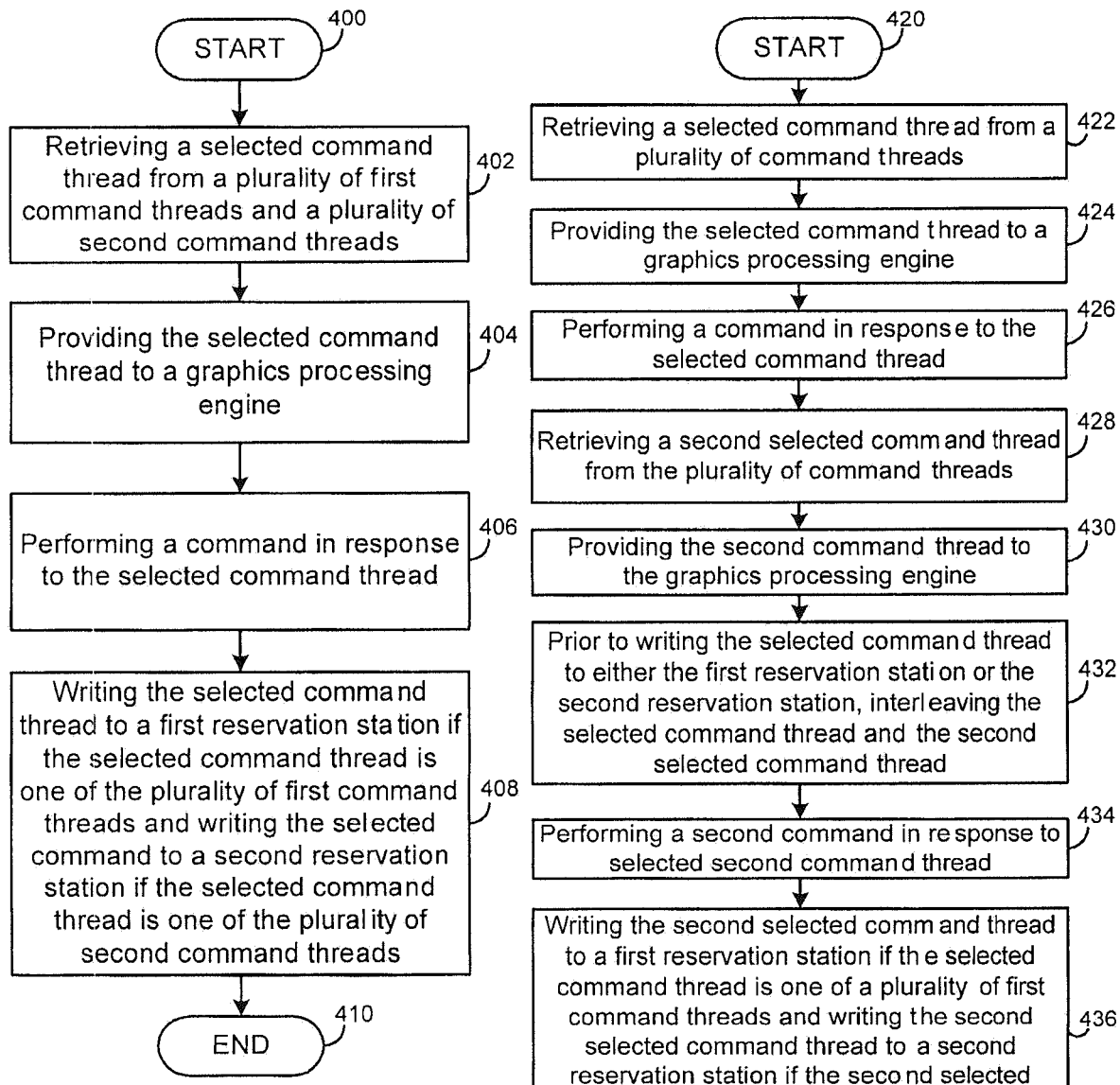

MULTI-THREAD GRAPHICS PROCESSING SYSTEM

CROSS-REFERENCE TO RELATED APPLICATIONS

This application is a continuation of U.S. application Ser. No. 17/167,717, filed on Feb. 4, 2021, which is a continuation of U.S. application Ser. No. 16/424,145, filed on May 28, 2019 (now U.S. Pat. No. 10,957,007), which is a continuation of U.S. application Ser. No. 15/901,603 (now U.S. Pat. No. 10,346,945), filed Feb. 21, 2018, which is a continuation of U.S. application Ser. No. 15/006,802 (now U.S. Pat. No. 9,922,395), filed Jan. 26, 2016, which is a continuation of U.S. application Ser. No. 14/299,600 (now U.S. Pat. No. 9,904,970), filed Jun. 9, 2014, which is a continuation of U.S. application Ser. No. 13/846,210 (now U.S. Pat. No. 8,749,563), filed Mar. 18, 2013, which is a continuation of U.S. application Ser. No. 11/746,446 (now U.S. Pat. No. 8,400,459), filed May 9, 2007, which is a continuation of U.S. application Ser. No. 10/673,761 (now U.S. Pat. No. 7,239,322), filed Sep. 29, 2003, all of which are incorporated herein by this reference.

BACKGROUND OF THE INVENTION

Field of the Invention

The present invention relates generally to graphics processing and more specifically to the interleaving of ALU operations with texture fetching operations.

Background Art

In a graphics processing system, it is important to manage and control multiple command threads relating to texture applications. In a typical graphics processing system, the processing elements, such as vertices and/or pixels, are processed through multiple steps providing for the application of textures and other processing instructions, such as done through one or more arithmetic logic units (ALU). To improve the operating efficiency of a graphics processing system, the control of the flow of the multiple command threads is preferred.

FIG. 1 illustrates a prior art sequencing system 100. The system 100 includes a first arbiter 101, a second arbiter 102 and a third arbiter 103 and multiple buffers 104, 106, 108 and 110. In a typical embodiment, the buffers are first in and first out (FIFO) buffers. Each of the buffers 104-110 include multiple command threads, such as 112, 114, 116, 118 stored therein. Moreover, the system 100 is divided into resource divisions, such as an ALU resource division 120 and a texture fetch resource division 122. In the ALU resource division 120, the command thread 118 may be received from an input command 124 as selected by the arbiter 101. The command thread 118 may then be withdrawn from the reservation stations 104 and 108 for the purpose of being provided to an ALU (not shown) and the command threads within the texture fetch resource division 122 maybe withdrawn from the reservation stations 106 and 110 to be provided to a texture fetch processors (not shown).

In the prior art embodiments of FIG. 1, the first buffer 104 receives an input command 124 and outputs a completed command thread 126 to the second arbiter 102. In one embodiment, the command thread may include an indicator, such as a flag, indicating when the access to the ALU resources has been completed for the associated command. The arbiter 102 receives the input command 124 and thereupon provides, in due course, the command thread to either an appropriate texture fetch buffer 110 or an ALU buffer 108. Thereupon, the steps are repeated where an output thread command 128 is provided to another ALU (not shown) or texture fetch processor (not shown) and returned to the buffer 108 or 110. The buffer 110 also produces the output 132 which is a command thread. The output 132 may be provided to another arbiter 103 to be provided further along the graphics processing pipeline.

The embodiment of FIG. 1 illustrates an inflexible system having specifically delineated ALU resource buffers and texture fetch resource buffers such that command threads must be sequentially provided between the various buffers 104, 106, 108 and 110. Furthermore, the system 100 of FIG. 1 does not support an unlimited number of dependent fetches based on the structure of the buffer 104-110 structure and connectivity between each other and with respect to available ALU resources and texture fetch resources.

As such, there is a need for a sequencing system for providing for the processing of multi-command threads that supports an unlimited number of dependent texture fetches.

BRIEF DESCRIPTION OF THE DRAWINGS

FIG. 6 illustrates a flowchart of a method for multi-thread command processing in accordance with one embodiment of the present invention; and FIG. 7 illustrates a flowchart of an alternative method for multi-thread processing.

DETAILED DESCRIPTION OF A PREFERRED EMBODIMENT

Generally, the present invention includes a multi-thread graphics processing system and method thereof including a reservation station having a plurality of command threads stored therein. A reservation station may be any type of memory device capable of reserving and storing command threads. Furthermore, a command thread is a sequence of commands applicable to the corresponding element, such as pixel command thread relative to processing of pixel elements and a vertex command thread relative to vertex processing commands. The system and method further includes an arbiter operably coupled to the reservation station such that the arbiter retrieves a first command thread of the plurality of command threads stored therein. The arbiter may be any implementation of hardware, software or combination thereof such that the arbiter receives the command thread and thereupon provides the command thread to a command processing engine. The system and method further includes the command processing engine coupled to receive the first command thread from the arbiter such that the command processor may perform at least one processing command from the command thread. Whereupon, a command processing engine provides the first command thread back to the associated reservation station.

The command processing engine may be any suitable engine as recognized by one having ordinary skill in the art for processing commands, such as a texture engine, an arithmetic logic unit, or any other suitable processing engine.

Figure 1:
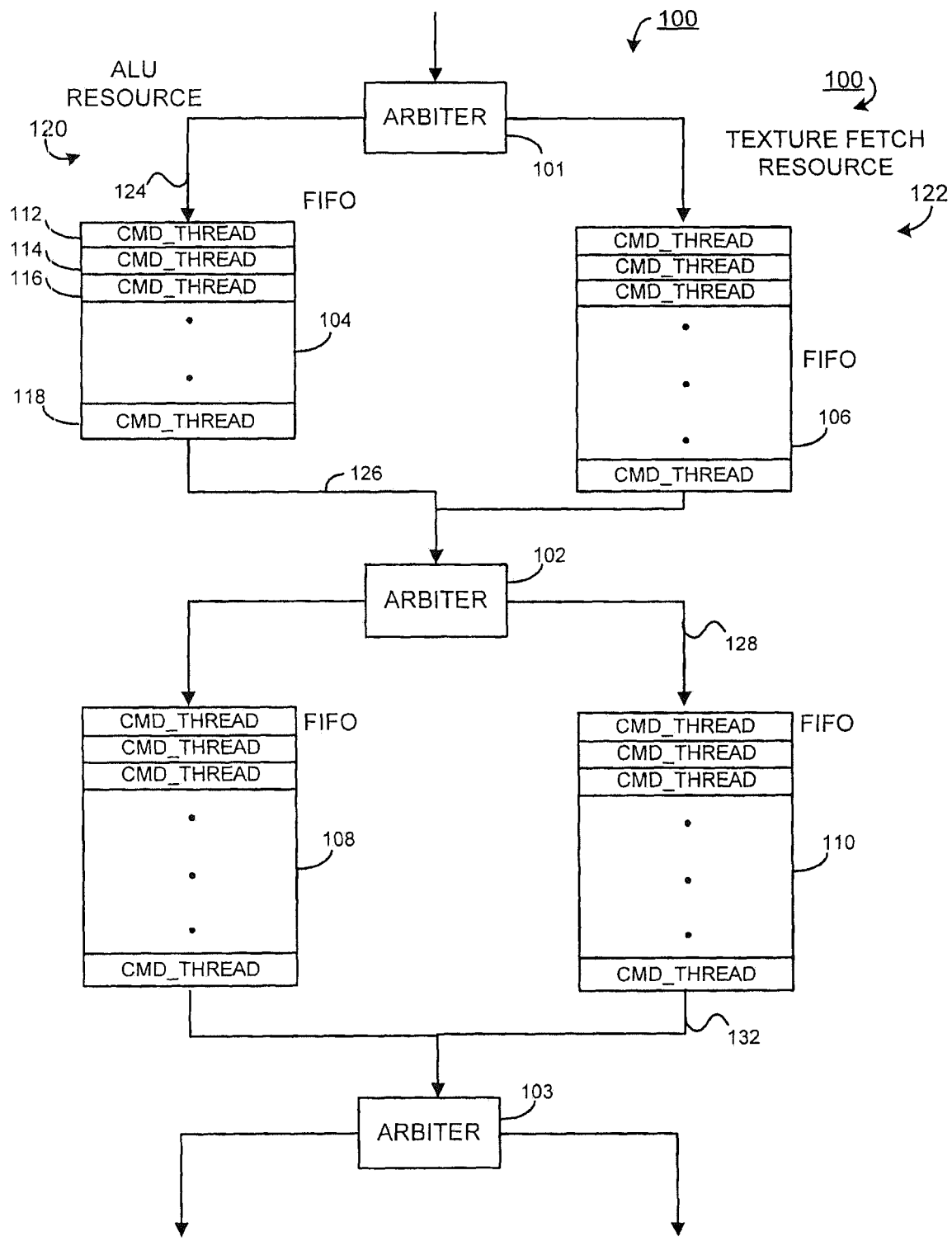
FIG. 1 illustrate the schematic block diagram of a prior art command thread processing system.
Figure 2:
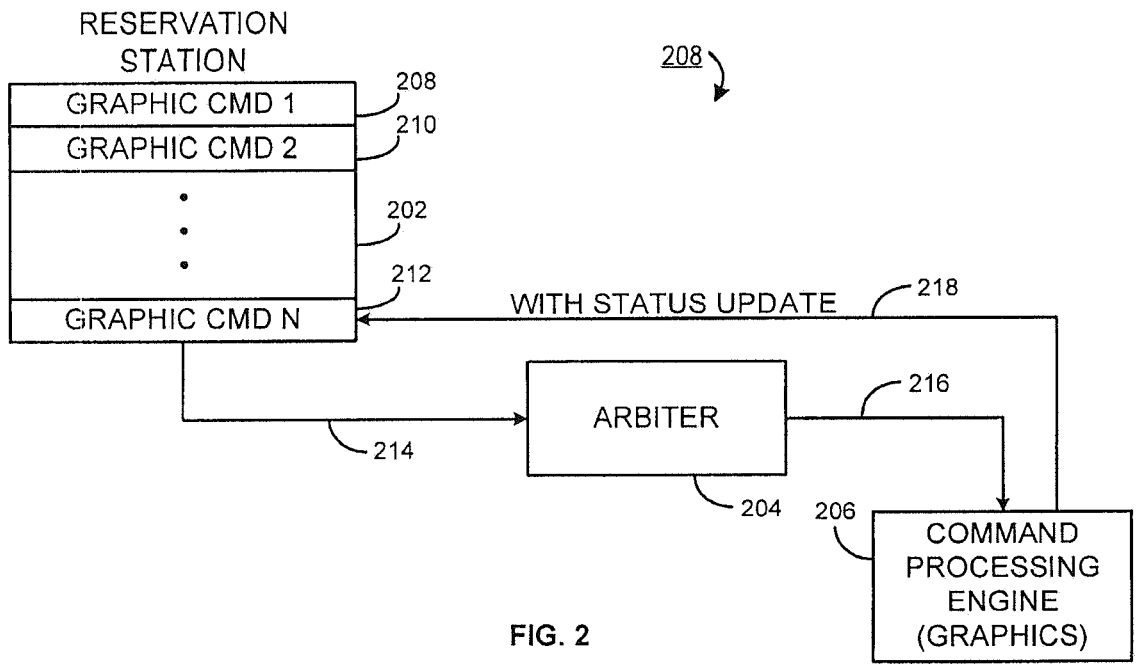
FIG. 2 illustrates a schematic block diagram of a multi-thread processing system, in accordance with one embodiment of the present invention.

More specifically, FIG. 2 illustrates one embodiment of a multi-thread processing system 200 in accordance with one embodiment of the present invention. The system 200 includes a reservation station 202, an arbiter 204 and a command processing engine 206. The reservation station includes a plurality of command threads 208, 210 and 212 for illustration purposes. In one embodiment, the command threads 208-212 are graphic command threads as illustrated in FIG. 2. As noted above, in one embodiment the reservation station 202 operates similar to a first in first out (FIFO) memory device, although command threads 208-212 may be retrieved from any location, whereas completed commands exit the memory device in a FIFO manner. The arbiter 204 retrieves a command thread via connection 214 and provides the retrieved command thread to the command processing engine 206, such as a graphics processing engine via connection 216. Thereupon, the command processing engine 206 performs a threaded command and provides a status update 218 to the reservation station 202, more specifically to the corresponding command thread, such as 208, 210 or 212.

The present invention provides for the processing of multiple threads. A command thread may go idle while waiting for available processing resources, such as specific data to be retrieved. As such, multiple threads prevent the corresponding resource from going idle. Further included within the command threads, 208-212, in one embodiment is an indicator, a done flag, which indicates when all of the commands within the command thread have been executed. Therefore, when all of the commands in the command thread have been executed and the command thread is retrievable from the reservation station 202, the command thread may be provided to a further processing element (not illustrated) within a graphics processing pipeline.

In one embodiment, the arbiter 204 retrieves the command threads 208-212 based on a priority scheme. For example, the priority may be based on specific commands that have been executed within a command thread or specific commands which are to be executed within a command for the effective utilization of the arbiter 204 and the command processing engine 206. In an alternative embodiment, the arbiter 204 may always retrieve the oldest available thread.

Figure 3:
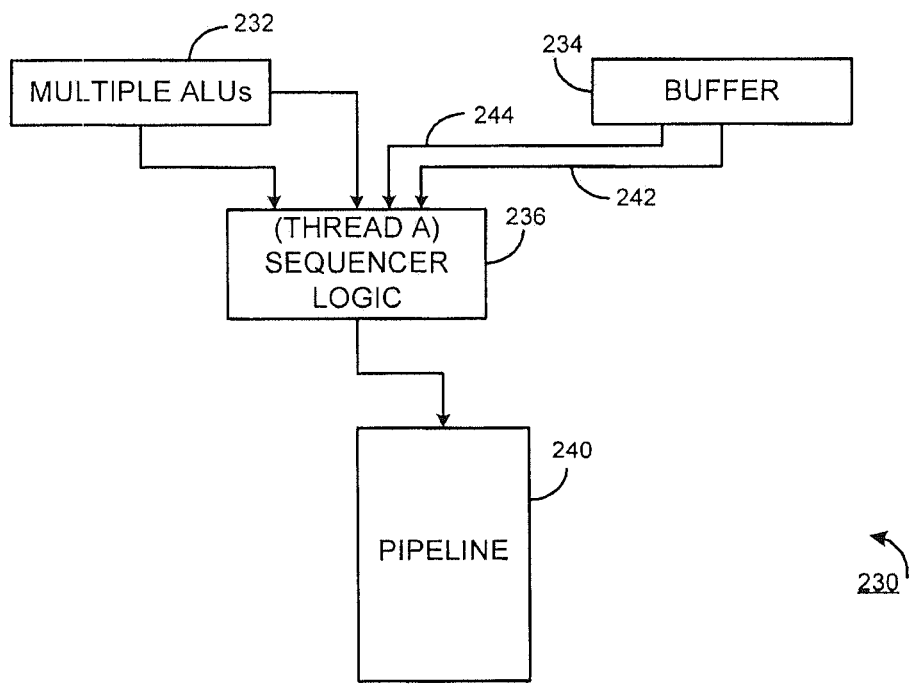
FIG. 3 illustrates a schematic block diagram of a pipeline vector machine in accordance with one embodiment of the present invention.

In accordance with one embodiment to the present invention, FIG. 3 illustrates a pipeline vector machine 230 including a multiple ALU system 232, a buffer 234 and sequencer logic 236, which may be an ALU resource. In one embodiment, the sequencer logic 236 receives a first thread 242, and a second thread 244 from the buffer 234, such that the logic 236 may perform simultaneous, interleaved execution of the command threads. Furthermore, the sequencer logic 236 is coupled to pipeline 240. In one embodiment, pipeline 240 may be an eight stage deep pipeline for providing vector analysis.

ALU arbitration proceeds in the same way as fetch arbitration. The ALU arbitration logic chooses one of the pending ALU clauses to be executed. The arbiter selects the command thread by looking at the reservation stations, herein vertex and pixel reservation stations, and picking the first command thread ready to execute. In one embodiment, there are two ALU arbiters, one for the even clocks and one for the odd clocks. For example, a sequence of two interleaved ALU clauses may resemble the following sequence: (E and O stands for Even and Odd sets of 4 clocks) Einst0 Oinst0 Einst1 Oinst1 Einst2 Oinst2 Einst0 Oinst3 Einst1 Oinst4 Einst2 Oinst0. As such, this way hides the latency of 8 clocks of the ALUs. Moreover, the interleaving also occurs across clause boundaries, as discussed in greater detail below.

Figure 4:
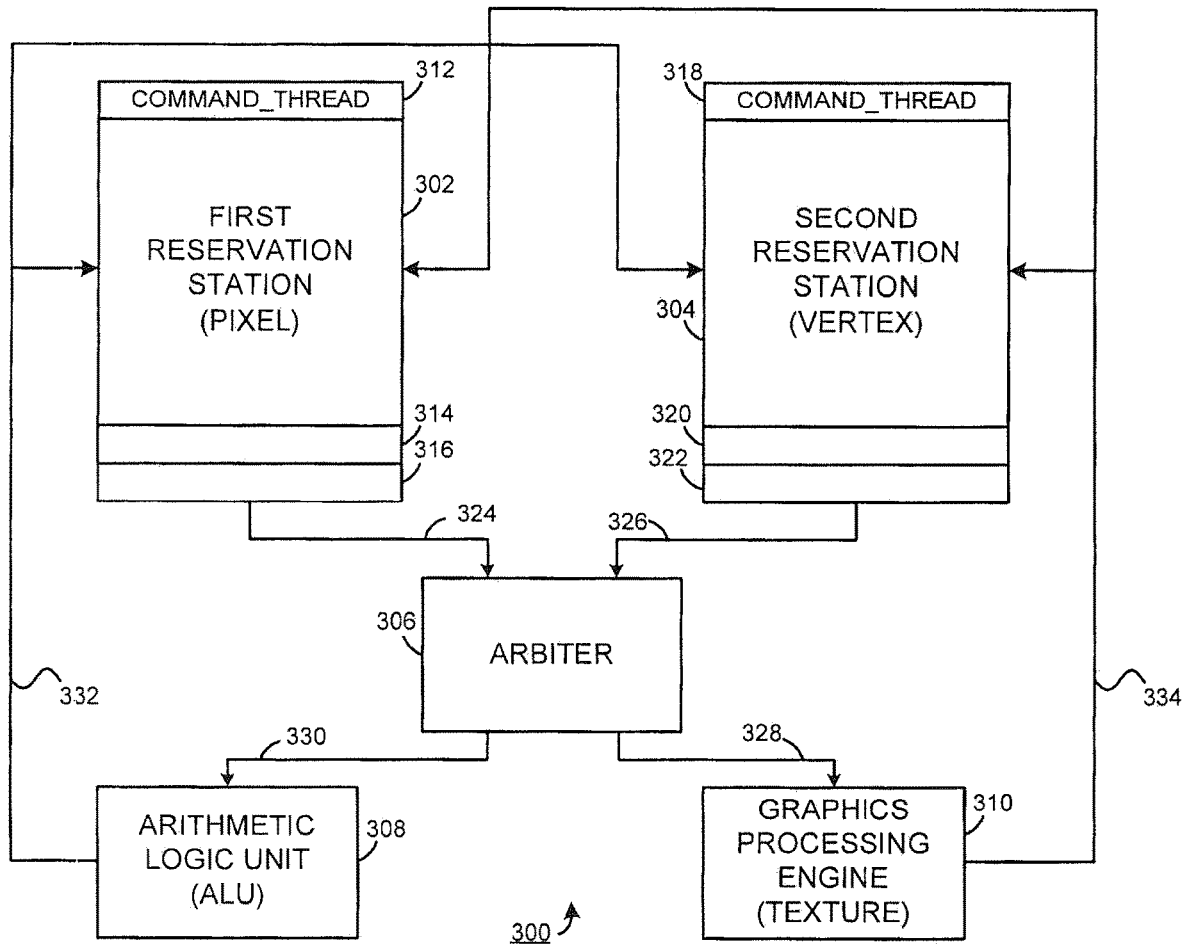
FIG. 4 illustrates a schematic block diagram of a multi-thread command processing system in accordance with one embodiment of the present invention.

FIG. 4 illustrates another embodiment of a multi-thread command processing system 300 having a first reservation station 302, a second reservation station 304, an arbiter 306, an ALU 308 and a graphics processing engine 310. In this embodiment, the first reservation station 302 is a pixel reservation station such that the command threads 312, 314 and 316 contain pixel-based commands therein. Furthermore, in this embodiment the second reservation station 304 is a vertex reservation station is directed towards vertex command threads illustrated as command threads 318, 320 and 322.

Although not illustrated in FIG. 4, in one embodiment an input arbiter provides the command threads to each of the first reservation station 302 and the second reservation station 304 based on whether the command thread is a pixel command thread, such as thread 312, or a vertex command thread, such as thread 318. In this embodiment, the arbiter 306 selectively retrieves either a pixel command thread, such as command thread 316, or a vertex command thread, such as command thread 322.

In one embodiment, each station 302, 304 maintains the state of each thread, such as threads 312-322. In one embodiment, the thread lives in a given location in the station 302, 304, in the order that the thread is received therein. From each buffer, the arbiter 306, which may be implemented as arbitration logic executed on a processing device, selects one thread for the graphics processing engine 310 and one thread for the ALU 308. Once a thread is selected by the arbiter 306, the thread is marked as invalid and submitted to the appropriate execution unit 308 or 310. Upon the execution of the associated command of the command thread, the thread is thereupon returned to the station 302 or 304 at the same storage location with its status updated, once all possible sequential instructions have been executed.

With respect to FIG. 4, a pixel command thread 324 may be retrieved by the arbiter 306 and a vertex command thread 326 may also be retrieved. The arbiter 306 then provides one thread 328, which may be either 324 or 326 to the graphics processing engine 310, such as a texture engine, and provides the other thread 330 to the ALU 308.

Upon execution of the command, the ALU 308 then returns the command thread 332 to the appropriate reservation station 302 or 304. As illustrated in FIG. 4, the ALU 308 is coupled to both reservation station 302 and reservation station 304 for providing the thread back thereto. The same data transfer occurs when the graphic processing engine 310 performs the commands and returns the command thread 334 back to the originating reservation station 302 or 304. It is also noted, that in the present embodiment, multiple command operations may be performed by a particular unit 308 or engine 310, but in order to switch a command thread from ALU 308 to a graphics processing engine 310, that command thread must be returned back to the appropriate reservation station 302 or 304 and re-retrieved by the arbiter 306 and thereupon provided to the other unit 308 or engine 310 respectively.

In one embodiment, each command thread within the reservation station 302 and 304 may be stored across two physical pieces of memory, wherein a majority of bits are stored in a one read port device. The bits required for the thread arbitration may be stored in a highly multi-ported structure, such that the bit stored in the one read port device are termed state bits and the bits stored in the multi-read port device are termed status bits.

In one embodiment the state bit includes, but not limited to, a control flow instruction pointer, a loop iterator, a call return pointer, predicated bits, a GPR base pointer, a context pointer, valid bits, and any other suitable bits as recognized by one having skill in the art. It is also noted that in one embodiment, index pointers are not included in the state bits, wherein one embodiment may be stored in the general processing registers.

In this embodiment, the fields of the state bits, the control flow instruction pointer, the execution count marker, loop iterators, call return pointers, predicate bits, are updated every time the thread is returned to the reservation station 302 or 304 based on how much progress has been made on the thread execution. It is also noted that in this embodiment, the GPR base pointer and context pointers are unchanged throughout the execution of the thread.

In one embodiment, the status bits include: a valid thread bit, a texture/ALU engine needed bit, a texture reads are outstanding bit and a waiting on texture read to complete bit. In this embodiment, all of the above status bit fields from the command threads go to the arbitration circuitry. Thereupon, the arbiter 306 selects the proper allocation of which command thread goes to the graphics processing engine 310 and which command thread goes to the ALU 308. In this embodiment, two sets of arbitration are performed: one for pixels, such as command thread 316 and one for vertices, such as command thread 322. Texture arbitration requires no allocation or ordering as it is purely based on selecting the oldest thread that requires the graphics processing engine 310.

Figure 5:
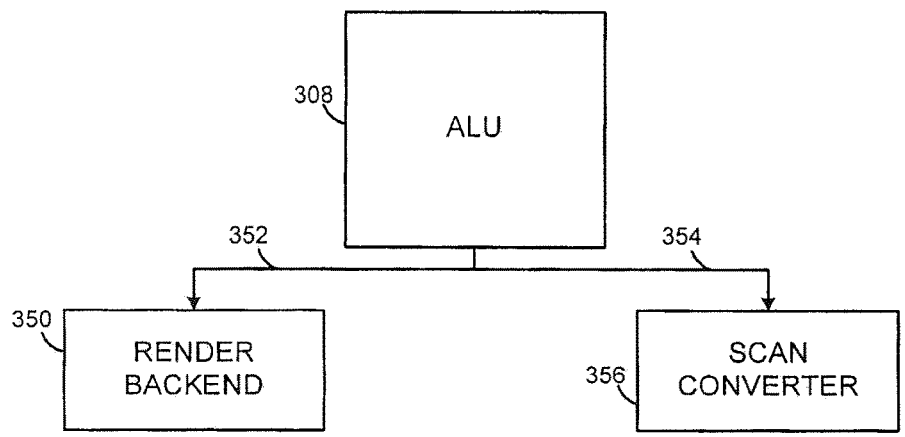
FIG. 5 illustrates a schematic block diagram of a graphics processing pipeline, in accordance with embodiment to the present invention.

FIG. 5 illustrates a block diagram representing the further execution of the command threads upon completion of all embedded commands therein. The ALU 308 is coupled to a render backend 350 via connection 352 and to a scan converter 356 via connection 354. As recognized by one having ordinary skill in the art, the ALU 308 may be operably coupled to the render backend 350 such that the bus 352 incorporates one or more of a plurality of connections for providing the completed command thread, such as command thread 316 of FIG. 4, thereto. Furthermore, as recognized by one having ordinary skill in the art, ALU 308 may be operably coupled to the scan converter 356 such that the connection 354 may be one or more of a plurality of connections for providing the executed command thread, such as command thread 322 of FIG. 4, to the scan converter 356. As discussed above, once the command thread's indicator bit, such as the done flag, is set, indicating all of the commands in the thread have been executed, the completed command thread is further provided in the processing pipeline. Moreover, the render backend 350 may be any suitable rendering backend for graphics processing as recognized by one having ordinary skill in the art. The scan converter 356 may be any suitable scan converter for graphics processing as recognized by one having ordinary skill in the art.

FIG. 6 illustrates a flow chart for a method of multi-thread command processing in accordance with one embodiment of the present invention. The method begins, step 400, by retrieving a selected command thread from a plurality of first command threads and a plurality of second command threads, step 402. For example, as discussed above with regard to FIG. 4, the selected command thread may be retrieved by the arbiter 306. The next step, step 404, is providing the selected command thread to a graphics command processing engine. As discussed above regarding FIG. 4, the arbiter 306 provides the selected command thread to the graphics processing engine 310, which, in one embodiment may be a texture engine. In another embodiment, the arbiter 306 may provide the selected command thread to the ALU 308.

The method further includes performing a command in response to the selected command thread, step 406. In this embodiment the command is performed by the graphics processing engine 310, which may be performing a texture operation. The next step, step 408, is writing the selected command thread to a first reservation station if the selected command thread is one of the plurality of first command threads and writing the selected command thread to a second reservation station if the selected command thread is one of the plurality of second command threads. With regard to FIG. 4, if the selected command thread is a pixel command thread, such as command thread 312-316, the graphics processing engine 310 provides the command thread 312-316 back thereto via connection 332. Furthermore, if the command thread is from the vertex reservation station 304, the command thread 318-320 may be provided thereto via connection 334 from the graphics processing engine 310. Thereupon, the method is complete, step 410.

FIG. 7 illustrates a flowchart of an alternative method for multi-thread processing.

The method begins, step 420, by retrieving a selected command thread from a plurality of command threads, step 422, similar to step 402 of FIG. 6. The next step, step 424, is providing the selected command thread to a graphics processing engine, similar to step 404 of FIG. 6.

Thereupon, the method further includes performing a command in response to the selected command thread, step 426, similar to step 406 of FIG. 6. The next step, step 428, is retrieving a second selected command thread from the plurality of command threads. Similar to step 422, the second selected command thread may be retrieved from either a first reservation station, such as reservation station 302 of FIG. 4 or a second reservation station, such as reservation station 304 of FIG. 4.

The method further includes providing the second command thread to the graphics processing engine, step 430. The next step, step 432, is prior to writing the selected command thread to either the first reservation station or the second reservation station, interleaving the selected command thread and the second selected command thread. Thereupon, the method further includes performing a second command in response to the second selected command thread, step 434.

In the embodiment where the graphics processing engine is a texture engine, the commands performed are directed to texture operations. Although, as recognized by one having ordinary skill in the art, any other suitable graphics processing engine may be utilized.

The next step, step 436, is writing the second selected command thread to a first reservation station if the selected command thread is one of a plurality of first command threads and writing the second command thread to a second reservation station if the second selected command thread is one of a plurality of second command threads. Furthermore, the method includes writing the selected command thread to the first reservation station if the selected command thread is one of the plurality of first command threads and the selected command thread to the second reservation station if the selected command thread is one of the plurality of second command threads, step 438. Once again, using the exemplary embodiment of FIG. 4, the command threads, such as 312-316 and/or 318-322 may be provided from the graphics processing engine 310 and written back thereto or in another embodiment may be provided to the ALU 308 by the arbiter 306 and, upon execution of an arithmetic command, provided back to the associated reservation station, 302 or 304 respectively.

As such, the present invention allows for multi-thread command processing effectively using designated reservation station, in conjunction with the arbiter, for the improved processing of multiple command threads. The present invention further provides for the effective utilization of the ALU and the graphics processing engine, such as the texture engine, for performing operations for both pixel command threads and vertex command threads, thereby improving graphics rendering and improving command thread processing flexibility.

It should be understood that there exists implementations of other variations and modifications of the invention and its various aspects, as may be readily apparent to those of ordinary skill in the art, and that the invention is not limited by the specific embodiments described herein. For example, the storage capacity of the reservation stations may be adequately adjusted to accommodate the storage any suitable corresponding number of command threads. It is therefore contemplated and covered by the present invention any and all modifications, variations, or equivalents that fall within the scope of the basic underlying principles disclosed and claimed herein.

The invention claimed is:

1. A graphics processing system comprising:
   a pixel reservoir portion including a first pixel memory device and a second pixel memory device, and operative to store a pixel command thread across the first pixel memory device and the second pixel memory device;
   a vertex reservoir portion including a first vertex memory device and a second vertex memory device, and operative to store a vertex command thread across the first vertex memory device and the second vertex memory device;
   an arbiter circuit, coupled to the pixel reservoir portion and the vertex reservoir portion, operative to select at least one of the pixel command thread or the vertex command thread to transmit to a graphics processing engine or an arithmetic logic unit (ALU);
   the graphics processing engine, coupled to the arbiter circuit, operable to execute the at least one of the pixel command thread or the vertex command thread; and
   the ALU, coupled to the arbiter circuit, operable to execute the at least one of the pixel command thread or the vertex command thread.

2. The graphics processing system of claim 1, further comprising a render backend, coupled to the ALU, for rendering an output of the ALU.

3. The graphics processing system of claim 1, further comprising a scan converter, coupled to the ALU, for processing an output of the ALU.

4. The graphics processing system of claim 1, wherein the graphics processing engine is a texture engine.

5. The graphics processing system of claim 1, wherein the first pixel memory device comprises a status bit for the pixel command thread, and the arbiter circuit is further operable to allocate the pixel command thread to the ALU or the graphics processing engine based upon the status bit.

6. The graphics processing system of claim 5, wherein the status bit includes at least one of a valid thread bit, a texture engine/ALU engine needed bit, a texture reads are outstanding bit, or a waiting on texture read to complete bit.

7. The graphics processing system of claim 1, wherein the arbiter circuit is further operable to select which command thread goes to the graphics processing engine and which command thread goes to the ALU.

8. The graphics processing system of claim 1, wherein at least one of the first pixel memory device or the first vertex memory device includes a multi-read port device.

9. The graphics processing system of claim 1, wherein at least one of the second pixel memory device or the second vertex memory device includes a one read port device.

10. The graphics processing system of claim 1, wherein the first pixel memory device and the second pixel memory device are physically separated.

11. The graphics processing system of claim 1, wherein the first vertex memory device and a second vertex memory device are physically separated.

12. A computer-implemented method comprising:
    storing, in a pixel reservoir portion of a memory device, a pixel command thread;
    storing, in a vertex reservoir portion of the memory device, a vertex command thread;
    selecting, by an arbiter circuit coupled to the memory device, at least one of the pixel command thread or the vertex command thread to transmit to a graphics processing engine or an arithmetic logic unit (ALU);
    executing, by the graphics processing engine coupled to the arbiter circuit, the at least one of the pixel command thread or the vertex command thread; and
    executing, by the ALU coupled to the arbiter circuit, the at least one of the pixel command thread or the vertex command thread.

13. The computer-implemented method of claim 12, further comprising:
    upon executing of the at least one of the pixel command thread or the vertex command thread by the graphics processing engine or the ALU, returning the pixel command thread or the vertex command thread to the pixel reservoir portion or the vertex reservoir portion for storage.

14. The method of claim 12, further comprising transmitting, to a render backend coupled to the ALU, an output of the ALU for rendering.

15. The method of claim 12, further comprising transmitting, to a scan converter coupled to the ALU, an output of the ALU for further processing.

16. The method of claim 12, wherein the graphics processing engine is a texture engine.

17. The method of claim 12, wherein:
    the memory device comprises a status bit for the pixel command thread; and
    further comprising allocating, using the arbiter circuit, the pixel command thread to the ALU or the graphics processing engine based upon the status bit.

18. The method of claim 17, wherein the status bit includes at least one of a valid thread bit, a texture engine/ALU engine needed bit, a texture reads are outstanding bit, or a waiting on texture read to complete bit.

19. The method of claim 12, further comprising selecting, by the arbiter circuit, which command thread goes to the graphics processing engine and which command thread goes to the ALU.

20. The method of claim 12, wherein the pixel command thread and the vertex command thread are stored on physically separated parts of the memory device.

\* \* \* \* \*